United States Patent
Heck et al.

(10) Patent No.: US 10,268,681 B2
(45) Date of Patent: *Apr. 23, 2019

(54) AUGMENTED CONVERSATIONAL UNDERSTANDING AGENT TO IDENTIFY CONVERSATION CONTEXT BETWEEN TWO HUMANS AND TAKING AN AGENT ACTION THEREOF

(71) Applicant: Microsoft Technology Licensing, LLC, Redmond, WA (US)

(72) Inventors: Larry Paul Heck, Los Altos, CA (US); Madhusudan Chinthakunta, Saratoga, CA (US); David Mitby, Mountain View, CA (US); Lisa Stifelman, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/620,567

(22) Filed: Jun. 12, 2017

(65) Prior Publication Data

US 2018/0129646 A1    May 10, 2018

Related U.S. Application Data

(63) Continuation of application No. 13/076,862, filed on Mar. 31, 2011, now Pat. No. 9,760,566.

(51) Int. Cl.
*G06F 17/27* (2006.01)
*H04M 1/725* (2006.01)
(Continued)

(52) U.S. Cl.
CPC ........ *G06F 17/279* (2013.01); *G06F 17/2785* (2013.01); *G06F 17/289* (2013.01); *G06N 99/005* (2013.01); *H04M 1/72519* (2013.01)

(58) Field of Classification Search
CPC .................................................... G06F 17/279
See application file for complete search history.

(56) References Cited

U.S. PATENT DOCUMENTS

| 4,560,977 A | 12/1985 | Murakamu |
| 4,627,620 A | 12/1986 | Yang |

(Continued)

FOREIGN PATENT DOCUMENTS

| CN | 1313972 | 9/2001 |
| CN | 1325527 | 12/2001 |

(Continued)

OTHER PUBLICATIONS

Chinese Office Action in Application 201210091176.3, dated Feb. 2, 2018, 5 pages.

(Continued)

*Primary Examiner* — Farzad Kazeminezhad

(57) ABSTRACT

An augmented conversational understanding agent may be provided. Upon receiving, by an agent, at least one natural language phrase from a user, a context associated with the at least one natural language phrase may be identified. The natural language phrase may be associated, for example, with a conversation between the user and a second user. An agent action associated with the identified context may be performed according to the at least one natural language phrase and 201 a result associated with performing the action may be displayed.

20 Claims, 5 Drawing Sheets

(51) Int. Cl.
*G06N 99/00* (2010.01)
*G06F 17/28* (2006.01)

(56) References Cited

U.S. PATENT DOCUMENTS

| | | | |
|---|---|---|---|
| 4,630,910 A | 12/1986 | Ross et al. |
| 4,645,458 A | 2/1987 | Williams |
| 4,688,195 A | 8/1987 | Thompson |
| 4,695,953 A | 9/1987 | Blair et al. |
| 4,702,475 A | 10/1987 | Elstein et al. |
| 4,711,543 A | 12/1987 | Blair et al. |
| 4,727,354 A | 2/1988 | Lindsay |
| 4,751,642 A | 6/1988 | Silva et al. |
| 4,772,946 A | 9/1988 | Hammer |
| 4,796,997 A | 1/1989 | Svetkoff et al. |
| 4,809,065 A | 2/1989 | Harris et al. |
| 4,811,398 A | 3/1989 | Copperi et al. |
| 4,817,950 A | 4/1989 | Goo |
| 4,843,568 A | 6/1989 | Krueger et al. |
| 4,868,750 A | 9/1989 | Kucera et al. |
| 4,893,183 A | 1/1990 | Nayar |
| 4,901,362 A | 2/1990 | Terzian |
| 4,925,189 A | 5/1990 | Braeunig |
| 4,969,192 A | 11/1990 | Chen et al. |
| 5,101,444 A | 3/1992 | Wilson et al. |
| 5,146,406 A | 9/1992 | Jensen |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,259,766 A | 11/1993 | Sack |
| 5,265,014 A | 11/1993 | Haddock et al. |
| 5,288,078 A | 2/1994 | Capper et al. |
| 5,295,491 A | 3/1994 | Gevins |
| 5,299,125 A | 3/1994 | Baker |
| 5,320,538 A | 6/1994 | Baum |
| 5,325,298 A | 6/1994 | Gallant |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,418,948 A | 5/1995 | Turtle |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,600,765 A | 2/1997 | Ando |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein, Jr. |
| 5,680,628 A | 10/1997 | Carus et al. |
| 5,682,196 A | 10/1997 | Freeman |
| 5,682,229 A | 10/1997 | Wangler |
| 5,690,582 A | 11/1997 | Ulrich et al. |
| 5,694,559 A | 12/1997 | Hobson et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,737,734 A | 4/1998 | Schultz |
| 5,748,974 A | 5/1998 | Johnson |
| 5,794,050 A | 8/1998 | Dahlgren et al. |
| 5,819,260 A | 10/1998 | Lu et al. |
| 5,861,886 A | 1/1999 | Moran et al. |
| 5,875,108 A | 2/1999 | Hoffberg et al. |
| 5,877,803 A | 3/1999 | Wee et al. |
| 5,880,743 A | 3/1999 | Moran et al. |
| 5,895,464 A | 4/1999 | Bhandari et al. |
| 5,913,727 A | 6/1999 | Ahdoot |
| 5,930,746 A | 7/1999 | Ting |
| 5,933,125 A | 8/1999 | Fernie et al. |
| 5,963,940 A | 10/1999 | Liddy et al. |
| 5,970,446 A | 10/1999 | Goldberg et al. |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng |
| 6,098,458 A | 8/2000 | French et al. |
| 6,100,896 A | 8/2000 | Strohecker et al. |
| 6,101,289 A | 8/2000 | Kellner |
| 6,111,580 A | 8/2000 | Kazama et al. |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,212,494 B1 | 4/2001 | Boguraev |
| 6,215,890 B1 | 4/2001 | Matsuo et al. |
| 6,215,898 B1 | 4/2001 | Woodfill et al. |
| 6,222,465 B1 | 4/2001 | Kumar et al. |
| 6,226,396 B1 | 5/2001 | Marugame |
| 6,229,913 B1 | 5/2001 | Nayar et al. |
| 6,246,981 B1 | 6/2001 | Papineni et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,345,111 B1 | 2/2002 | Yamaguchi et al. |
| 6,363,160 B1 | 3/2002 | Bradski et al. |
| 6,384,819 B1 | 5/2002 | Hunter |
| 6,397,179 B2 | 5/2002 | Crespo et al. |
| 6,401,086 B1 | 6/2002 | Bruckner |
| 6,411,725 B1 | 6/2002 | Rhoads |
| 6,411,744 B1 | 6/2002 | Edwards |
| 6,430,997 B1 | 8/2002 | French et al. |
| 6,434,520 B1 | 8/2002 | Kanevsky et al. |
| 6,476,834 B1 | 11/2002 | Doval et al. |
| 6,496,598 B1 | 12/2002 | Harman |
| 6,503,195 B1 | 1/2003 | Keller et al. |
| 6,512,838 B1 | 1/2003 | Ratii et al. |
| 6,539,931 B2 | 4/2003 | Trajkovic et al. |
| 6,553,345 B1 | 4/2003 | Kuhn et al. |
| 6,570,555 B1 | 5/2003 | Prevost et al. |
| 6,601,026 B2 | 7/2003 | Appelt et al. |
| 6,633,294 B1 | 10/2003 | Rosenthal et al. |
| 6,640,202 B1 | 10/2003 | Dietz et al. |
| 6,658,377 B1 | 12/2003 | Anward et al. |
| 6,661,918 B1 | 12/2003 | Gordon et al. |
| 6,665,640 B1 | 12/2003 | Bennett et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,757,362 B1 | 6/2004 | Cooper et al. |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,895,083 B1 | 5/2005 | Bers et al. |

(56) References Cited

U.S. PATENT DOCUMENTS

| | | |
|---|---|---|
| 6,937,742 B2 | 8/2005 | Roberts et al. |
| 6,950,534 B2 | 9/2005 | Cohen et al. |
| 6,970,947 B2 | 11/2005 | Ebling et al. |
| 6,990,639 B2 | 1/2006 | Wilson |
| 6,999,932 B1 | 2/2006 | Zhou |
| 7,003,134 B1 | 2/2006 | Covell et al. |
| 7,027,974 B1 | 4/2006 | Busch et al. |
| 7,028,269 B1 | 4/2006 | Cohen-Solal et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,050,977 B1 | 5/2006 | Bennett |
| 7,058,204 B2 | 6/2006 | Hildreth et al. |
| 7,060,957 B2 | 6/2006 | Lange et al. |
| 7,100,082 B2 | 8/2006 | Little |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,231,609 B2 | 6/2007 | Baudisch |
| 7,251,781 B2 | 7/2007 | Batchilo et al. |
| 7,259,747 B2 | 8/2007 | Bell |
| 7,272,601 B1 | 9/2007 | Wang et al. |
| 7,308,112 B2 | 12/2007 | Fujimura et al. |
| 7,317,836 B2 | 1/2008 | Fujimura et al. |
| 7,328,216 B2 | 2/2008 | Hofmann et al. |
| 7,348,963 B2 | 3/2008 | Bell |
| 7,359,121 B2 | 4/2008 | French et al. |
| 7,366,655 B1 | 4/2008 | Gupta |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,519,223 B2 | 4/2009 | Dehlin et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,596,767 B2 | 9/2009 | Wilson |
| 7,598,942 B2 | 10/2009 | Underkoffler et al. |
| 7,606,700 B2 | 10/2009 | Ramsey et al. |
| 7,607,509 B2 | 10/2009 | Schmiz et al. |
| 7,617,200 B2 | 11/2009 | Budzik |
| 7,620,202 B2 | 11/2009 | Fujimura et al. |
| 7,640,164 B2 | 12/2009 | Sasaki et al. |
| 7,647,228 B2 | 1/2010 | Silvera et al. |
| 7,665,041 B2 | 2/2010 | Wilson et al. |
| 7,668,340 B2 | 2/2010 | Cohen et al. |
| 7,672,845 B2 | 3/2010 | Beranek et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,716,056 B2 | 5/2010 | Weng et al. |
| 7,720,674 B2 | 5/2010 | Kaiser et al. |
| 7,720,856 B2 | 5/2010 | Godecke et al. |
| 7,725,322 B2 | 5/2010 | Kwak et al. |
| 7,729,530 B2 | 6/2010 | Antonov et al. |
| 7,746,345 B2 | 6/2010 | Hunter |
| 7,747,438 B2 | 6/2010 | Nguyen |
| 7,747,601 B2 | 6/2010 | Cooper et al. |
| 7,756,708 B2 | 7/2010 | Cohen et al. |
| 7,760,182 B2 | 7/2010 | Ahmad et al. |
| 7,797,303 B2 | 9/2010 | Roulland et al. |
| 7,809,167 B2 | 10/2010 | Bell |
| 7,822,597 B2 | 10/2010 | Brun |
| 7,834,846 B1 | 11/2010 | Bell |
| 7,852,262 B2 | 12/2010 | Namineni et al. |
| 7,869,998 B1 | 1/2011 | Di Fabbrizio |
| 7,890,500 B2 | 2/2011 | Bobrow et al. |
| 7,890,539 B2 | 2/2011 | Boschee et al. |
| 7,898,522 B2 | 3/2011 | Hildreth et al. |
| 8,000,453 B2 | 8/2011 | Cooper et al. |
| 8,019,610 B2 | 9/2011 | Walker |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 8,073,681 B2 | 12/2011 | Baldwin et al. |
| 8,108,208 B2 | 1/2012 | Makela |
| 8,117,635 B2 | 2/2012 | Hendricks |
| 8,140,556 B2 | 3/2012 | Rao et al. |
| 8,144,840 B2 | 3/2012 | Luehrig et al. |
| 8,155,962 B2 | 4/2012 | Kennewick et al. |
| 8,165,886 B1 | 4/2012 | Gagnon |
| 8,180,629 B2 | 5/2012 | Rehberg |
| 8,260,817 B2 | 9/2012 | Boschee et al. |
| 8,265,925 B2 | 9/2012 | Aarskog |
| 8,265,939 B2 | 9/2012 | Kanevsky et al. |
| 8,317,518 B2 | 11/2012 | Jarrell |
| 8,335,754 B2 | 12/2012 | Dawson et al. |
| 8,352,245 B1 | 1/2013 | Lloyd |
| 8,355,914 B2 | 1/2013 | Joh et al. |
| 8,380,489 B1 | 2/2013 | Zhang |
| 8,448,083 B1 | 5/2013 | Migos |
| 8,468,019 B2 | 6/2013 | Rempel |
| 8,489,115 B2 | 7/2013 | Rodriguez et al. |
| 8,521,766 B1 | 8/2013 | Hoarty |
| 8,521,786 B2 | 8/2013 | Black et al. |
| 8,595,222 B2 | 11/2013 | Dean |
| 8,595,642 B1 | 11/2013 | Lagassey |
| 8,600,747 B2 | 12/2013 | Abella et al. |
| 8,612,208 B2 | 12/2013 | Cooper et al. |
| 8,612,747 B2 | 12/2013 | Roskind |
| 8,762,358 B2 | 6/2014 | Datta et al. |
| 8,825,661 B2 | 9/2014 | Joshi et al. |
| 8,880,406 B2 | 11/2014 | Santos-Lang et al. |
| 8,881,122 B1 | 11/2014 | Klimek et al. |
| 8,898,163 B2 | 11/2014 | Banerjee et al. |
| 9,064,006 B2 | 6/2015 | Hakkani-Tur |
| 9,064,066 B2 | 6/2015 | Kumar et al. |
| 9,082,402 B2 | 7/2015 | Yadgar |
| 9,123,341 B2 | 9/2015 | Weng et al. |
| 9,197,736 B2 | 11/2015 | Davis |
| 9,244,984 B2 | 1/2016 | Heck et al. |
| 9,298,287 B2 | 3/2016 | Heck et al. |
| 9,318,108 B2 | 4/2016 | Gruber |
| 9,454,962 B2 | 9/2016 | Tur et al. |
| 9,497,499 B2 | 11/2016 | Chang et al. |
| 9,760,566 B2 * | 9/2017 | Heck .................. G06F 17/279 |
| 9,812,120 B2 | 11/2017 | Takatsuka |
| 9,842,168 B2 | 12/2017 | Heck et al. |
| 9,858,343 B2 | 1/2018 | Heck et al. |
| 10,049,667 B2 | 8/2018 | Heck et al. |
| 10,061,843 B2 | 8/2018 | Hakkani-Tur et al. |
| 2001/0020954 A1 | 9/2001 | Hull |
| 2001/0053968 A1 | 12/2001 | Galitksy |
| 2002/0059069 A1 | 5/2002 | Hsu et al. |
| 2002/0059289 A1 | 5/2002 | Vvenegrat et al. |
| 2002/0165860 A1 | 11/2002 | Glover |
| 2003/0125955 A1 | 7/2003 | Arnold et al. |
| 2003/0137537 A1 | 7/2003 | Guo et al. |
| 2003/0236099 A1 | 12/2003 | Desiher et al. |
| 2004/0078725 A1 | 4/2004 | Little |

(56) References Cited

U.S. PATENT DOCUMENTS

| | | |
|---|---|---|
| 2004/0083092 A1 | 4/2004 | Valles |
| 2004/0117189 A1 | 6/2004 | Bennett |
| 2004/0122674 A1 | 6/2004 | Bangalore et al. |
| 2004/0172460 A1 | 9/2004 | Marel et al. |
| 2004/0189720 A1 | 9/2004 | Wilson et al. |
| 2004/0193420 A1 | 9/2004 | Kennewick et al. |
| 2004/0220797 A1 | 11/2004 | Wang et al. |
| 2004/0225499 A1 | 11/2004 | Wang et al. |
| 2005/0033582 A1 | 2/2005 | Gadd et al. |
| 2005/0074140 A1 | 4/2005 | Grasso et al. |
| 2005/0270293 A1 | 12/2005 | Guo et al. |
| 2005/0271864 A1 | 12/2005 | van driesten et al. |
| 2005/0278164 A1 | 12/2005 | Hudson |
| 2005/0289124 A1 | 12/2005 | Kaiser et al. |
| 2006/0036430 A1 | 2/2006 | Hu |
| 2006/0074631 A1 | 4/2006 | Wang et al. |
| 2006/0074883 A1 | 4/2006 | Teevan et al. |
| 2006/0080101 A1 | 4/2006 | Chotimongkol et al. |
| 2006/0136375 A1 | 6/2006 | Cox |
| 2006/0173868 A1 | 8/2006 | Angele et al. |
| 2006/0206306 A1 | 9/2006 | Cao |
| 2006/0206333 A1 | 9/2006 | Paek et al. |
| 2006/0206336 A1 | 9/2006 | Gurram et al. |
| 2006/0206454 A1 | 9/2006 | Forstall et al. |
| 2006/0235689 A1 | 10/2006 | Sugihara |
| 2006/0271353 A1 | 11/2006 | Berkan |
| 2006/0271356 A1 | 11/2006 | Vos |
| 2006/0271520 A1 | 11/2006 | Ragan |
| 2006/0293874 A1 | 12/2006 | Zhang et al. |
| 2007/0005363 A1 | 1/2007 | Cucerzan et al. |
| 2007/0038436 A1 | 2/2007 | Cristo et al. |
| 2007/0055508 A1 | 3/2007 | Zhao et al. |
| 2007/0071209 A1 | 3/2007 | Horvitz |
| 2007/0100624 A1 | 5/2007 | Weng et al. |
| 2007/0106497 A1 | 5/2007 | Ramsey et al. |
| 2007/0118357 A1 | 5/2007 | Kasravi et al. |
| 2007/0124134 A1 | 5/2007 | Van Kommer |
| 2007/0124263 A1 | 5/2007 | Katariya et al. |
| 2007/0136068 A1 | 6/2007 | Horvitz |
| 2007/0136222 A1 | 6/2007 | Horvitz |
| 2007/0143155 A1 | 6/2007 | Whitsett et al. |
| 2007/0174343 A1 | 7/2007 | Fortuna |
| 2007/0299798 A1 | 12/2007 | Suyama et al. |
| 2007/0299799 A1 | 12/2007 | Meehan et al. |
| 2008/0005068 A1 | 1/2008 | Dumais |
| 2008/0026838 A1 | 1/2008 | Dunstan et al. |
| 2008/0040114 A1 | 2/2008 | Zhou et al. |
| 2008/0040510 A1 | 2/2008 | Warner |
| 2008/0080678 A1 | 4/2008 | Ma et al. |
| 2008/0082518 A1 | 4/2008 | Loftesness |
| 2008/0097951 A1 | 4/2008 | Gupta |
| 2008/0140389 A1 | 6/2008 | Funakoshi |
| 2008/0140657 A1 | 6/2008 | Azvine et al. |
| 2008/0152191 A1 | 6/2008 | Fujimura et al. |
| 2008/0168037 A1 | 6/2008 | Kapadia et al. |
| 2008/0167876 A1 | 7/2008 | Bakis |
| 2008/0172359 A1 | 7/2008 | Lundell et al. |
| 2008/0201280 A1 | 8/2008 | Martin et al. |
| 2008/0201434 A1 | 8/2008 | Holmes et al. |
| 2008/0221870 A1 | 9/2008 | Attardi et al. |
| 2008/0228467 A1 | 9/2008 | Womack et al. |
| 2008/0231926 A1 | 9/2008 | Klug et al. |
| 2008/0235199 A1 | 9/2008 | Li et al. |
| 2008/0294628 A1 | 11/2008 | Shoval et al. |
| 2008/0300871 A1 | 12/2008 | Gilbert |
| 2008/0306934 A1 | 12/2008 | Craswell et al. |
| 2008/0319944 A1 | 12/2008 | Venolia |
| 2008/0319962 A1 | 12/2008 | Riezler et al. |
| 2009/0006333 A1 | 1/2009 | Jones et al. |
| 2009/0006345 A1 | 1/2009 | Platt et al. |
| 2009/0006389 A1 | 1/2009 | Piscitello et al. |
| 2009/0008398 A1 | 1/2009 | Nakatsuji et al. |
| 2009/0012778 A1 | 1/2009 | Feng |
| 2009/0012842 A1 | 1/2009 | Srinivasan et al. |
| 2009/0027337 A1 | 1/2009 | Hildreth |
| 2009/0055380 A1 | 2/2009 | Peng |
| 2009/0076917 A1 | 3/2009 | Jablokov et al. |
| 2009/0077047 A1 | 3/2009 | Cooper et al. |
| 2009/0079813 A1 | 3/2009 | Hildreth |
| 2009/0089126 A1 | 4/2009 | Odubiyi |
| 2009/0089128 A1 | 4/2009 | Tkatch et al. |
| 2009/0094036 A1 | 4/2009 | Ehlen et al. |
| 2009/0112596 A1 | 4/2009 | Syrdal et al. |
| 2009/0112782 A1 | 4/2009 | Cross et al. |
| 2009/0119587 A1 | 5/2009 | Allen et al. |
| 2009/0135740 A1 | 5/2009 | Dhara et al. |
| 2009/0141933 A1 | 6/2009 | Wagg |
| 2009/0177645 A1 | 7/2009 | Heck |
| 2009/0187402 A1 | 7/2009 | Scholl |
| 2009/0221368 A1 | 9/2009 | Yen et al. |
| 2009/0232288 A1 | 9/2009 | Forbes et al. |
| 2009/0234655 A1 | 9/2009 | Kwon |
| 2009/0248422 A1 | 10/2009 | Li et al. |
| 2009/0248659 A1 | 10/2009 | McCool et al. |
| 2009/0281789 A1 | 11/2009 | Waibel et al. |
| 2009/0292687 A1 | 11/2009 | Fan et al. |
| 2009/0315740 A1 | 12/2009 | Hildreth et al. |
| 2009/0327889 A1 | 12/2009 | Jeong et al. |
| 2010/0005081 A1 | 1/2010 | Bennett |
| 2010/0023320 A1 | 1/2010 | DiCristo et al. |
| 2010/0023331 A1 | 1/2010 | Duta et al. |
| 2010/0036717 A1 | 2/2010 | Trest |
| 2010/0036831 A1 | 2/2010 | Vemuri |
| 2010/0057463 A1 | 3/2010 | Weng et al. |
| 2010/0057801 A1 | 3/2010 | Ramer et al. |
| 2010/0070517 A1 | 3/2010 | Ghosh et al. |
| 2010/0082610 A1 | 4/2010 | Anick |
| 2010/0093435 A1 | 4/2010 | Glaser et al. |
| 2010/0095206 A1 | 4/2010 | Kim |
| 2010/0112189 A1 | 5/2010 | Yu |
| 2010/0114574 A1 | 5/2010 | Liu et al. |
| 2010/0121839 A1 | 5/2010 | Meyer |
| 2010/0138215 A1 | 6/2010 | Williams |
| 2010/0138410 A1 | 6/2010 | Liu |
| 2010/0161642 A1 | 6/2010 | Chen |
| 2010/0169098 A1 | 7/2010 | Patch |
| 2010/0199227 A1 | 8/2010 | Xiao et al. |
| 2010/0205180 A1 | 8/2010 | Cooper et al. |
| 2010/0217604 A1 | 8/2010 | Baldwin et al. |
| 2010/0235341 A1 | 9/2010 | Bennett |
| 2010/0235375 A1 | 9/2010 | Sidhu et al. |
| 2010/0250518 A1 | 9/2010 | Bruno |
| 2010/0274796 A1 | 10/2010 | Beauregard et al. |
| 2010/0281435 A1 | 11/2010 | Bangalore et al. |
| 2010/0306591 A1 | 12/2010 | Krishna |
| 2010/0312779 A1 | 12/2010 | Lim et al. |
| 2010/0313125 A1 | 12/2010 | Fleizach |
| 2010/0318398 A1 | 12/2010 | Brun et al. |
| 2010/0318549 A1 | 12/2010 | Mayr |
| 2011/0016005 A1 | 1/2011 | Li et al. |
| 2011/0022992 A1 | 1/2011 | Zhou et al. |
| 2011/0040777 A1 | 2/2011 | Stefanov |
| 2011/0047149 A1 | 2/2011 | Vaananen |
| 2011/0078159 A1 | 3/2011 | Li et al. |
| 2011/0082848 A1 | 4/2011 | Goldentouch |
| 2011/0099476 A1 | 4/2011 | Snook et al. |
| 2011/0105190 A1 | 5/2011 | Cha |
| 2011/0137943 A1 | 6/2011 | Asano |
| 2011/0144999 A1 | 6/2011 | Jang et al. |
| 2011/0219340 A1 | 9/2011 | Pathangay |
| 2011/0313768 A1 | 12/2011 | Klein et al. |
| 2011/0320470 A1 | 12/2011 | Williams et al. |
| 2011/0320945 A1 | 12/2011 | Wong |
| 2012/0016678 A1 | 1/2012 | Gruber et al. |
| 2012/0030637 A1 | 2/2012 | Day et al. |
| 2012/0035924 A1 | 2/2012 | Jitkoff et al. |
| 2012/0059842 A1 | 3/2012 | Hille-Doering et al. |
| 2012/0078636 A1 | 3/2012 | Ferrucci |
| 2012/0082353 A1 | 4/2012 | Kelusky et al. |
| 2012/0130822 A1 | 5/2012 | Patwa et al. |
| 2012/0131073 A1 | 5/2012 | Olney |
| 2012/0136865 A1 | 5/2012 | Blom et al. |
| 2012/0166178 A1 | 6/2012 | Latzina |
| 2012/0197999 A1 | 8/2012 | Agarwal et al. |

(56) References Cited

U.S. PATENT DOCUMENTS

| | | |
|---|---|---|
| 2012/0216151 A1 | 8/2012 | Sarkar |
| 2012/0233207 A1 | 9/2012 | Mohajer |
| 2012/0242586 A1 | 9/2012 | Krishnaswamy |
| 2012/0253788 A1 | 10/2012 | Heck et al. |
| 2012/0253789 A1 | 10/2012 | Heck et al. |
| 2012/0253790 A1 | 10/2012 | Heck et al. |
| 2012/0253791 A1 | 10/2012 | Heck et al. |
| 2012/0253793 A1 | 10/2012 | Ghannam et al. |
| 2012/0253802 A1 | 10/2012 | Heck et al. |
| 2012/0254227 A1 | 10/2012 | Heck et al. |
| 2012/0254810 A1 | 10/2012 | Heck et al. |
| 2012/0290290 A1 | 11/2012 | Tur et al. |
| 2012/0296643 A1 | 11/2012 | Kristjansson et al. |
| 2012/0316862 A1 | 12/2012 | Sultan et al. |
| 2012/0327009 A1 | 12/2012 | Fleizach |
| 2013/0013644 A1 | 1/2013 | Sathish et al. |
| 2013/0080472 A1 | 3/2013 | Cohen et al. |
| 2013/0117022 A1 | 5/2013 | Chen et al. |
| 2013/0185081 A1 | 7/2013 | Cheyer et al. |
| 2013/0241834 A1 | 9/2013 | Vennelakanti et al. |
| 2013/0273976 A1 | 10/2013 | Rao et al. |
| 2014/0006012 A1 | 1/2014 | Zhou et al. |
| 2014/0059030 A1 | 2/2014 | Hakkani-Tur |
| 2015/0127323 A1 | 5/2015 | Jacquet |
| 2015/0356418 A1 | 12/2015 | Yampolska et al. |
| 2016/0004707 A1 | 1/2016 | Hakkani-Tur |
| 2016/0118046 A1 | 4/2016 | Heck et al. |
| 2016/0140228 A1 | 5/2016 | Cohen et al. |
| 2016/0179807 A1 | 6/2016 | Kumar et al. |
| 2017/0011025 A1 | 1/2017 | Tur et al. |
| 2017/0075985 A1 | 3/2017 | Chakraborty et al. |
| 2018/0075151 A1 | 3/2018 | Heck |

FOREIGN PATENT DOCUMENTS

| | | |
|---|---|---|
| CN | 1692407 | 11/2005 |
| CN | 1963752 | 10/2006 |
| CN | 1845052 | 5/2007 |
| CN | 1983271 | 6/2007 |
| CN | 101120341 | 2/2008 |
| CN | 101297355 | 10/2008 |
| CN | 101339551 A | 1/2009 |
| CN | 101254344 B | 6/2010 |
| CN | 101499277 | 5/2011 |
| EP | 357909 A1 | 3/1990 |
| EP | 583061 A2 | 2/1994 |
| EP | 919906 A2 | 6/1999 |
| EP | 1335338 A2 | 8/2003 |
| EP | 1793318 | 6/2007 |
| JP | H0844490 A | 2/1996 |
| JP | 08-235185 | 9/1996 |
| JP | 2001022779 | 1/2001 |
| JP | 2001-125592 | 5/2001 |
| JP | 2001125896 | 5/2001 |
| JP | 2002-024285 | 1/2002 |
| JP | 2002-082748 | 3/2002 |
| JP | 2003-505712 | 2/2003 |
| JP | 2003-115951 | 4/2003 |
| JP | 2004212641 | 7/2004 |
| JP | 2004328181 | 11/2004 |
| JP | 2004-341672 | 12/2004 |
| JP | 2005-043461 | 2/2005 |
| JP | 2006-202159 | 8/2006 |
| JP | 2009116733 | 5/2009 |
| JP | 2009-205552 | 9/2009 |
| JP | 2010-128665 | 6/2010 |
| JP | 2010-519609 | 6/2010 |
| JP | 2010-145262 | 7/2010 |
| JP | 2010-230918 | 10/2010 |
| JP | 2010538375 A | 12/2010 |
| KR | 1020050032649 | 4/2005 |
| KR | 10-1007336 | 1/2011 |
| KR | 10-2011-0066357 | 6/2011 |
| TW | 504624 | 10/2002 |
| WO | 9310708 A1 | 6/1993 |
| WO | 9519031 A1 | 7/1995 |
| WO | 9717598 A1 | 5/1997 |
| WO | 9803907 A2 | 1/1998 |
| WO | 9942920 A1 | 8/1999 |
| WO | 9944698 A2 | 9/1999 |
| WO | 2000/73900 | 12/2000 |
| WO | 2000/75808 | 12/2000 |
| WO | 0073995 A2 | 12/2000 |
| WO | 2006042028 | 6/2006 |
| WO | 2007/064482 | 6/2007 |
| WO | 2008/049206 | 5/2008 |
| WO | 2008069519 A1 | 6/2008 |
| WO | 2008100690 A1 | 8/2008 |
| WO | 2009029905 | 5/2009 |
| WO | 2009059065 A1 | 5/2009 |
| WO | 2012135210 A2 | 10/2012 |

OTHER PUBLICATIONS

U.S. Appl. No. 13/077,431, Office Action dated Jan. 29, 2018, 15 pages.
Japanese Notice of Allowance in Application 2017-038097, dated Feb. 5, 2018, 3 pages. (No English Translation.).
Korean Office Action in Application 10-2013-7025540, dated Jan. 31, 2018, 13 pages.
U.S. Appl. No. 14/989,974, Notice of Allowance dated Feb. 5, 2018, 2 pgs.
U.S. Appl. No. 15/271,859, Office Action dated Jan. 8, 2018, 44 pages.
Yasufumi Kaneko et al., "Detecting Search Intention by Analyzing Relationship between Keywords with Relaxation Value and an Interface for Inputting Keywords," Jun. 27, 2008, Journal of DBSJ, 7th volume, No. 1, p. 181-186 (No English Translation).
U.S. Appl. No. 14/989,974, Notice of Allowance dated Apr. 13, 2018, 5 pgs.
U.S. Appl. No. 14/733,188, Notice of Allowance dated Apr. 24, 2018, 7 pgs.
Chu-Carroll et al., "A Hybrid Approach to Natural Language Web Search," Proc of Conf on Empirical Methods in Natural Language Processing, Jul. 2002, Association for Computational Linguistics, 8 pgs.
Di Buccio Emanuele et al., "Detecting verbose queries and improving information retrieval," Information Processing & Management, vol. 50, No. 2, Oct. 28, 2013, 19 pgs.
Goodwin, "Which Search Engine Would be a Jeopardy Champion?" retrieved Apr. 12, 2012 from http://searchenginewatch.com/article/2050114/which-search-engine-would-be-a-jeopardy-champion, Jan. 2011, 2 pgs.
Gupta et al., "Information Retrieval with Verbose Queries", Foundations and Trends in Information Retrieval, vol. 9, No. 3-4, Jul. 31, 2015, pp. 209-354.
Huston et al., "Evaluating verbose query processing techniques", Proceedings of the 33rd International ACM Sigir Conference on Research and Development in Information Retrieval, Sigir '10, ACM Press, New York, New York, Jul. 19, 2010, pp. 291-298.
Molla et al., "AnswerFinder at TREC 2004," In Proceedings of the Thirteenth Text Retrieval Conference, TREC, Nov. 16, 2004, 9 pgs.
PCT International Search Report in PCT/US2013/049085, dated Nov. 7, 2013, 8 pgs.
PCT International Search Report in PCT/US2016/050840, dated Dec. 6, 2016, 12 pgs.
U.S. Appl. No. 13/539,674, Office Action dated Mar. 17, 2015, 12 pgs.
U.S. Appl. No. 13/539,674, Office Action dated Oct. 27, 2015, 15 pgs.
Wang et al., "Web-Based Unsupervised Learning for Query Formation in Question Answering", Proc 2nd Intl Joint Conf on Natural Language Processing, Oct. 2005, 12 pgs.
U.S. Appl. No. 13/077,303, Advisory Action dated Feb. 2, 2017, 3 pgs.
Chinese Office Action in Application 201210087420.9, dated Jan. 12, 2017, 5 pgs.

(56) References Cited

OTHER PUBLICATIONS

Japanese Notice of Allowance in Application 2014-502723, dated Jan. 4, 2017, 3 pgs. (No English Translation.).
U.S. Appl. No. 13/077,431, Office Action dated Feb. 3, 2017, 16 pgs.
Chinese Office Action in Application 201210091176.3, dated Dec. 21, 2016, 9 pgs.
Japanese Office Action in Application 2014502721, dated Nov. 22, 2016, 4 pgs.
U.S. Appl. No. 13/077,396, Office Action dated Jan. 27, 2017, 36 pgs.
U.S. Appl. No. 13/076,862, Notice of Allowance dated Dec. 1, 2016, 16 pgs.
Chinese 2nd Office Action in Application 201210092263.0, dated Aug. 16, 2016, 5 pgs.
Chinese 2nd Office Action in Application 201210101485.4, dated Aug. 16, 2016, 5 pgs.
U.S. Appl. No. 13/077,233, Office Action dated Nov. 10, 2016, 41 pgs.
U.S. Appl. No. 13/106,374, Notice of Allowance dated Aug. 4, 2016, 2 pgs.
U.S. Appl. No. 13/077,303, Office Action dated Oct. 26, 2016, 16 pgs.
Chinese Office Action in Application 201210090634.1, dated Jun. 30, 2016, 10 pgs.
U.S. Appl. No. 13/077,431, Office Action dated Jun. 29, 2016, 16 pgs.
U.S. Appl. No. 14/733,188, Office Action dated Oct. 25, 2016, 16 pgs.
A. Celikyilmaz, D. Hakkani-Tur, and G. Tur, "Approximate Interference for Domain Detection in Spoken Language Understanding," in Proceedings of Interspeech, Florence, Italy, 2011.
Abela, et al., abstract entitled "SemChat: Extracting Personal Information from Chat Conversations," Retrieved Date: Oct. 12, 2010. http://staff.um.edu.mt/cabe2/supervising/undergraduate/overview/keith_cortis.pdf, 10 pgs.
Abstract entitled "Adding Intelligence to the Interface," Published Date: 1996 IEEE. http://www.hitl.washington.edu/publications/billinghurst/vrais96/, 12 pgs.
Agichtein, et al., "Improving Web Search Ranking by Incorporating User Behavior Information", In Proceedings of the 29th Annual International ACM SIGIR Conference on Research and Development in Information Retrieval, Aug. 6, 2006, 8 pgs.
Antoine, et al., Abstract entitled "Automatic Adaptive Understanding of Spoken Language by Cooperation of Syntactic Parsing and Semantic Priming"—Published Date: 1994. Obtained at: http://www-clips.imag.fr/geod/User/jean.caelen/Publis_fichiers/SyntaxeSemantique.pdf, 5 pgs.
Aye, et al., article entitled "Use of Ontologies for Bridging Semantic Gaps in Distant Communication," Published Date: 2008. http://ieeexplore.ieee.org/stamp/stamp.jsp?tp=&arnumber=4781725, 5 pgs.
Castells, et al., article entitled "Scalable semantic personalized search of spoken and written contents on the Semantic Web,A" Published Date: 2005. http://webcache.googleusercontent.com/search?q=cache:http://ir.ii.uam.es/s5t/informes/TIN2005-06885.pdf, 12 pgs.
Chinese Office Action and Search Report Issued in Patent Application No. 201210092263.0, dated Dec. 10, 2015, 15 pgs.
Chinese Office Action and Search Report Issued in Patent Application No. 201210101485.4, dated Dec. 11, 2015, 14 Pgs.
Chinese Office Action in Application 201210087420.9, dated May 5, 2016, 18 pgs.
Chinese Office Action in Application 201210090349.X, dated Jun. 15, 2016, 13 pgs.
Chinese Office Action in Application 2012100911763, dated May 25, 2016, 14 pgs.
Chinese Office Action in Application 201210093414.4, dated Jun. 3, 2016, 16 pgs.
Cozzolongo, et al., "Personalized Control of Smart Environments", In Lecture Notes in Computer Science, vol. 4511, Jul. 25, 2007, 5 pgs.
D. Hakkani-Tur, G. Tur, L. Heck, and E. Shriberg, "Bootstrapping Domain Detection Using Query Click Logs for New Domains," in Proceedings of Interspeech, Florence, Italy, 2011.
D. Hillard, A. Celikyilmaz, D. Hakkani-Tur, and G. Tur, "Learning Weighted Entity Lists from Web Click Logs for Spoken Language Understanding," in Proceedings of Interspeech, Florence, Italy, 2011.
Díaz et al., "CO-Prétegé: A Groupware Tool for Supporting Collaborative Ontology Design with Divergence"; alicia.diaz@sol.info.unlp.edu.ar; Jul. 18, 2005; [retrieved Mar. 26, 2015]; 4 pgs.
Dowding, et al. Article entitled "Gemini: A Natural Language System for Spoken Language Understanding" pp. 54-61. Obtained on May 12, 2011 at website: http://acl.ldc.upenn.edu/P/P93/P93-1008.pdf , 8 pgs.
EP Communication dated Apr. 20, 2015 in Application No. PCT/US2012/030636, 8 pgs.
EP Extended Search Report Received for European Patent Application No. 12763913.6, dated Sep. 1, 2015, 13 pgs.
EP Search Report Issued in European Patent Application No. PCT/US2012/030730, dated May 11, 2015, 9 pgs.
EP Search Report Received for European Patent Application No. 12765896.1, dated May 28, 2015, 12 pgs.
EP Supplementary Search Report Issued in European Patent Application No. PCT/US2012/031722, dated May 11, 2015, 11 pgs.
EP Supplementary Search Report Received for European Patent Application No. PCT/US2012/031736, dated May 11, 2015, 10 pgs.
Fabbrizio et al., Abstract entitled "Bootstrapping Spoken Dialog Systems with Data Reuse," Retrieved Date: Oct. 12, 2010. http://www.sigdial.org/workshops/workshop5/proceedings/pdf/difabbrizio.pdf, 9 pgs.
Finkel, et al., Abstract entitled "Incorporating Non-Local Information into Information Extraction Systems by Gibbs Sampling"—Published Date: Jan. 3, 2006. Obtained at: http://nlp.stanford.edu/~manning/papers/gibbscrf3.pdf,8 pgs.
G. Tur and R. D. Mori, Eds., Spoken Language Understanding: Systems for Extracting Semantic Information from Speech. New York, NY: John Wiley and Sons, 2011, 484 pgs.
Gillick, et al. Article entitled "Some Statistical Issues in the Comparison of Speech Recognition Algorithms." Published in the Proceedings at the IEEE Conference on Acoustics, Speech and Sig. Proc., Glasglow, 1989; pp. 532-535. http://citeseerx.ist.psu.edu/viewdoc/download?doi=10.1.1.162.2233&rep=rep1&type=pdf, 4 pgs.
Gorin, et al., Abstract entitled "How May I Help You?" Published in Speech Communication 23, Feb. 14, 1997, Revised May 23, 1997; pp. 113-127. http://disi.unitn.it/~riccardi/papers/specom97.pdf, 14 pgs.
Haffner, et al., "Optimizing SVMS for Complex Call Classification", In Proceedings of IEEE International Conference on Acoustics, Speech, and Signal Processing, Apr. 6, 2003, 4 pgs.
Hakkani-Tur, et al. Abstract entitled "Using Semantic and Syntactic Graphs for Call Classification" Published in the Proceedings of the ACL Workshop on Feature Engineering for Machine Learning in NLP, pp. 24-31 in Ann Arbor, Michigan, Jun. 2005. Obtained at: http://citeseerx.ist.psu.edu/viewdoc/download?doi=10.1.1.59.8566&rep=rep1&type=pdf,8 pgs.
Hakkani-Tur, et al., "Employing Web Search Query Click Logs for Multi-Domain Spoken Language Understanding", In Proceedings of IEEE Workshop on Automatic Speech Recognition and Understanding, Dec. 11, 2011, 6 pgs.
Hakkani-Tur, et al., "Exploiting Query Click Logs for Utterance Domain Detection in Spoken Language Understanding", In Proceedings of International Conference on Acoustics, Speech and Signal Processing, May 22, 2011, 4 pgs.
Hakkani-Tur, et al., "Mining Search Query Logs for Spoken Language Understanding", In Workshop on Future Directions and Needs in the Spoken Dialog Community: Tools and Data, Jun. 7, 2012, pp. 37-40.

(56) References Cited

OTHER PUBLICATIONS

He, et al. Abstract entitled "A Data-Driven Spoken Language Understanding System." Obtained on May 12, 2011 at website: http://citeseerxist.psu.edu/viewdoc/download?doi=10.1.1.141.5688&rep=rep1&type=pdf, 6 pgs.
Horiguchi et al., abstract entitled "GaChat: A chat system that displays online retrieval information in dialogue text," Published at the Workshop on Visual Interfaces to the Social and the Semantic Web Conference Feb. 8, 2009 in Sanibel Island, Florida. http://www.smart-ui.org/events/vissw2009/papers/VISSW2009-Horiguchi.pdf, 5 pgs.
Hu, et al., "SmartContext: An Ontology Based Context Model for Cooperative Mobile Learning", In Computer Supported Cooperative Work in Design III, May 3, 2006, pp. 717-726.
International Search Report & Written Opinion in PCT/US2012/030636 dated Oct. 31, 2012, 12 pgs.
International Search Report & Written Opinion in PCT/US2012/030730 dated Oct. 30, 2012, 10 pgs.
International Search Report & Written Opinion in PCT/US2012/030740 dated Nov. 1, 2012, 12 pgs.
International Search Report & Written Opinion in PCT/US2012/030751 dated Sep. 5, 2012, 9 pgs.
International Search Report & Written Opinion in PCT/US2012/030757 dated Nov. 1, 2012, 10 pgs.
International Search Report & Written Opinion in PCT/US2012/031722 dated Oct. 23, 2012, 11 pgs.
International Search Report & Written Opinion in PCT/US2012/031736 dated Oct. 31, 2012, 12 pgs.
International Search Report & Written Opinion in PCT/US2013/055232, dated Nov. 18, 2013, 10 pgs.
Japanese Office Action in Application 2014-502718, dated May 26, 2016, 9 pgs.
Japanese Office Action in Application 2014-502721, dated Mar. 3, 2016, 10 pgs.
Japanese Office Action in Application 2014-502723, dated Apr. 27, 2016, 7 pgs.
Jebara et al., article entitled "Tracking Conversational Context for Machine Mediation of Human Discourse," Retrieved Date: Oct. 1, 2010. http://www.cs.columbia.edu/~jebara/papers/conversation.pdf, 3 pgs.
Jeong, et al., Abstract entitled "Exploiting Non-Local Features for Spoken Language Understanding" Published in the Proceedings of the COLING/ACL 2006 Main Conference Poster Sessions, pp. 412-419 in Sydney, Australia Jul. 2006. Obtain copy at: http://www.aclweb.org/anthology/P/P06/P06-2054.pdf, 8 pgs.
Jung, J. Jason, "Ontology-based context Synchronization for an ad hoc social collaborations," Knowledge-Based Systems, vol. 21, 2008, pp. 573-580.
Klusch; "Information Agent Technology for the Internet: A Survey"; Data & Knowledge Engineering; vol. 36, Mar. 1, 2001, 36 pgs.
Koehn, et al., "Moses: Open Source Toolkit for Statistical Machine Translation", In Proceedings of the Annual Meeting of the Association for Computational Linguistics, Demonstration and Poster Session, Jun. 2007, 4 pgs.
Kok, et al., "Hitting the Right Paraphrases in Good Time", In Proceedings of Human Language Technologies: The Annual Conference of the North American Chapter of the Association for Computational Linguistics, Jun. 2010, 9 pgs.
Kolski et al., "A Review of Intelligent Human-Machine Interfaces in the Light of the ARCH Model"; Published online Nov. 13, 2009; International Journal of Human-Computer Interaction; vol. 10, No. 3; Sep. 1, 1998.
Kuansan Wang, Abstract entitled "Semantics Synchronous Understanding for Robust Spoken Language Applications"—Published Date: 2003, pp. 640-645. Obtained at: http://research.microsoft.com/pubs/77494/2003-kuansan-asru.pdf, 6 pgs.
Lee e al., article entitled "An Implementation of Multi-Modal Game Interface Based on PDAs," Published Date: Aug. 2007 at the IEEE Fifth International Conference on Software Engineering Research, Management and Applications. http://ieeexplore.ieee.org/stamp/stamp.jsp?tp=&arnumber=4297013, 8 pgs.
Lee, et al. Abstract entitled "Simplification of Nomenclature Leads to an Ideal IL for Human Language Communication"—Published Date: Oct. 28, 1997, at the AMTA/SIG-IL First Workshop on Interlinguas, San Diego, CA., Oct. 28, 1997; pp. 71-72. Obtained at: http://www.mt-archive.info/AMTA-1997-Lee.pdf, 2 pgs.
Lyons, et al., article entitled "Augmenting Conversations Using Dual—Purpose Speech,"—Published Date: 2004; College of Computing and GVU Center, Georgia Institute of Technology, Atlanta, Georgia, http://www.cc.gatech.edu/ccg/publications/dp-uist.pdf,10 pgs.
Mairesse, et al., article entitled Learning to Personalize Spoken Generation for Dialogue Systems—Published Date: 2005.http://citeseerxist.psu.edu/viewdoc/download?doi=10.1.1.66.9988&rep=rep1&type=pdf, 4 pgs.
Marcialis, et al., article entitled "SEARCHY: An Agent to Personalize Search Results," Published Date: Jun. 20, 2008 at the IEEE Third International Conference on Internet and Web Applications and Services Conference. http://ieeexplore.ieee.org/stamp/stamp.jsp?tp=&arnumber=4545664, 6 pgs.
Mark Billinghurst, article entitled "Put That Where? Voice and Gesture at the Graphics Interface," Published in the Nov. 1998 Computer Graphics. http://delivery.acm.org/10.1145/310000/307730/p60-billinghurst.pdf?key1=307730&key2=0278375821&coll=GUIDE&dl=GUIDE&CFID=103683245&CFTOKEN=90378528, 5 pgs.
Mittal, et al., "A Hybrid Approach of Personalized Web Information Retrieval." Proceedings of the 2010 IEEE/WIC/ACM International Conference on Web Intelligence and Intelligent Agent Technology, Aug. 31, 2010, vol. 1, pp. 308-313.
Moschitti, et al., Abstract entitled "Spoken Language Understanding with Kernels for Syntactic/Semantic Structures" Published in the 2007 IEEE Proceedings, pp. 183-188. Obtained at: http://ieeexplore.ieee.org/stamp/stamp.jsp?tp=&arnumber=4430106,6 pgs.
Moustakas et al., article entitled "Master-Piece: A Multimodal (Gesture+Speech) Interface for 3D Model Search and Retrieval Integrated in a Virtual Assembly Application," Presented and Published Jul. 18-Aug. 12, 2005 at Enterface '05 in Mons, Belgium. http://www.enterface.net/enterface05/docs/results/reports/project7.pdf, 14 pgs.
Mylonas et al., article entitled "Personalized information retrieval based on context and ontological knowledge," Retrieved Date: Sep. 30, 2010. Printed in the United Kingdom and Presented in The Knowledge Engineering Review, vol. 23:1, 73-100; 2007, Cambridge University Press. http://citeseerx.ist.psu.edu/viewdoc/download?doi=10.1.1.148.4272&rep=rep1&type=pdf, 28 pgs.
Nguyen, et al., article entitled "An Adaptive Plan Based Dialogue Agent: Integrating Learning into a BDI Architecture," Published Date: May 8-12, 2006 at AAMASA '06 in Hakodate, Hokkaido, Japan. http://www.cse.unsw.edu.au/~wobcke/papers/adaptive-dialogue.pdf,3 pgs.
Nijholt, et al., "Google Home: Experience, Support and Re-Experience of Social Home Activities", In Information Sciences, vol. 178, Issue 3, Nov. 6, 2007, 19 pgs.
Notice of Allowance dated Dec. 18, 2015, in U.S. Appl. No. 13/077,455, 2 pgs.
Notice of Allowance dated Dec. 3, 2014 in U.S. Appl. No. 13/592,638, 8 pgs.
Notice of Allowance dated Dec. 3, 2015, in U.S. Appl. No. 13/077,455, 2 pgs.
Notice of Allowance dated Feb. 17, 2015 in U.S. Appl. No. 13/592,638, 8 pgs.
Notice of Allowance dated Oct. 7, 2015, in U.S. Appl. No. 13/077,368, 15 pgs.
Notice of Allowance dated Sep. 18, 2015, in U.S. Appl. No. 13/077,455, 7 pgs.
Och, et al., "A Systematic Comparison of Various Statistical Alignment Models", In Journal of Computational Linguistics, vol. 29, Issue 1, Mar. 2003, 33 pgs.
P. J. Price, Abstract entitled "Evaluation of Spoken Language Systems: The ATIS Domain" Obtained on May 12, 2011, 5 pgs. from the following website: http://acl.ldc.upenn.edu/H/H90/H90-1020.pdf.

(56) References Cited

OTHER PUBLICATIONS

Panton et al., "Common Sense Reasoning—From Cyc to Intelligent Assistant"; Cycorp, Inc.; Jan. 1, 2006; Ambient Intelligence in Everyday Life Lecture Notes in Computer Science; 32 pgs.
Petrov et al., Abstract entitled "Learning and Inference for Hierarchically Split PCFGs" Published in 2007 in cooperation with the Association for the Advancement of Artificial Intelligence. Obtained at: http://www.petrovi.de/data/aaai07.pdf, 4 pgs.
Pissinou, et al., "A Roadmap to the Utilization of Intelligent Information Agents: Are Intelligent Agents the Link Between the Database and Artificial Intelligence Communities?", In IEEE Knowledge and Data Engineering Exchange Workshop, Jan. 1, 1997, 10 pgs.
Power Point Presentation entitled "Spoken Language Understanding for Conversational Dialog Systems," Presented and published at the IEEE/ACL 2006 Workshop on Spoken Language Technology in Aruba, Dec. 10-13, 2006. http://www.slt2006.org/MichaelMcTear.ppt, 33 pgs.
Raymond, et al, Abstract entitled "Generative and Discriminative Algorithms for Spoken Language Understanding", Published Aug. 27-31, 2007 at the Interspeech 2007 Conference in Antwerp, Belgium; pp. 1605-1608.Obtain at: http://citeseerx.ist.psu.edu/viewdoc/download?doi=10.1.1.106.2105&rep=rep1&type=pdf, 4 pgs.
Richard A. Bolt, "Put-That-There: Voice and Gesture at the Graphics Interface", Architecture Machine Group, MIT, 1980, 9 pgs.
Riezler, et al., "Query Rewriting Using Monolingual Statistical Machine Translation", In Journal of Computational Linguistics Archive, vol. 36, Issue 3, Sep. 2010, pp. 569-582.
Robert Brown, article entitled "Exploring New Speech Recognition and Synthesis APIs in Windows Vista," published in MSDN Magazine, Retrieved Date: Oct. 12, 2010. http://msdn.microsoft.com/en-us/magazine/cc163663.aspx, 11 pgs.
Schapire, et al. Abstract entitled "BoosTexter: A Boosting-Based System for Text Categorization,". Obtaining May 12, 2011 at website: http://citeseerx.ist.psu.edu/viewdoc/download?doi=10.1.1.33.1666&rep=rep1&type=pdf, 34 pgs.
Senior, et al., article entitled "Augmenting Conversational Dialogue by Means of Latent Semantic Googling,"—Published Date: Oct. 4-6, 2005, Trento, Italy. http://www.hml.queensu.ca/files/po265-senior.pdf, 7 pgs.
Sherwani, et al., article entitled "VoicePedia: Towards Speech-based Access to Unstructured Information,"—Published Date: 2007. http://www.cs.cmu.edu/~jsherwan/pubs/voicepedia.pdf, 4 pgs.
Siebra, et al., "SmartChat—An Intelligent Environment for Collaborative Discussions", In Proceedings of 7th International Conference on Intelligent Tutoring Systems, Aug. 30, 2004, pp. 883-885.
Stegmann, et al., abstract entitled "Multimodal Interaction for Access to Media Content," Retrieved Date: Sep. 29, 2010. http://www.icin.biz/files/2008papers/Poster-08.pdf, 4 pgs.
Stephanie Seneff. Article entitled "TINA: A Natural Language System for Spoken Language Applications" Published in the 1992 Edition of Association for Computational Linguistics, vol. 18, No. 1, pp. 61-86; 26 pgs. Obtained at: http://citeseerx.ist.psu.edu/viewdoc/download?doi=10.1.1.75.1626&rep=rep1&type=pdf.
Taiwan Notice of Allowance Issued in Patent Application No. 101105673, dated Mar. 2, 2016, 4 Pgs.
Taiwan Search Report Issued in Patent Application No. 101105673, dated Oct. 16, 2015, 9 Pgs.
Technical Whitepaper entitled "Speak With Me, Inc." Retrieved Date: Sep. 24, 2010. http://www.speakwithme.com/files/pdf/whitepaper.pdf, 11 pgs.
Tomuro et al., article entitled "Personalized Search in Folksonomies with Ontological User Profiles," Retrieved Date: Sep. 30, 2010. http://facweb.cs.depaul.edu/noriko/papers/iis09.pdf, 14 pgs.
Tur, et al., "Model Adaptation for Dialog Act Tagging", In Proceedings of IEEE Spoken Language Technology Workshop, Dec. 10, 2006, 4 pgs.
Tur, et al., Abstract entitled "Semi-Supervised Learning for Spoken Language Understanding Using Semantic Role Labeling"— Published Date: 2005, pp. 232-237. Obtained at: http://ieeexplore.ieee.org/stamp/stamp.jsp?arnumber=01566523, 6 pgs.
Tur, et al., Abstract entitled "What is Left to be Understood in ATIS?" Published in the Proceedings of the IEEE SLT Workshop in Berkeley, CA., 2010 , 6 pgs.
Turunen et al. article entitled "Multimodal Interaction with Speech and Physical Touch Interface in a Media Center Application," Presented and Published Oct. 29-31, 2009 at Ace 2009 in Athens, Greece. http://delivery.acm.org/10.1145/1700000/1690392/p19-turunen.pdf?key1=1690392&key2=5824375821&coll=GUIDE&dl=GUIDE&CFID=103676711&CFTOKEN=24231502, 8 pgs.
U.S. Official Action dated Apr. 9, 2015, in U.S. Appl. No. 13/077,368, 8 pgs.
U.S. Official Action dated Aug. 1, 2013 in U.S. Appl. No. 13/076,862, 28 pgs.
U.S. Official Action dated Aug. 24, 2012, in U.S. Appl. No. 13/077,431, 15 pgs.
U.S. Official Action dated Dec. 24, 2013 in U.S. Appl. No. 13/592,638, 14 pgs.
U.S. Official Action dated Dec. 4, 2015 in U.S. Appl. No. 13/106,374, 54 pgs.
U.S. Official Action dated Dec. 4, 2015, in U.S. Appl. No. 13/077,396, 33 pgs.
U.S. Official Action dated Dec. 7, 2015, in U.S. Appl. No. 13/077,303, 19 pgs.
U.S. Official Action dated Feb. 24, 2014, in U.S. Appl. No. 13/077,396, 28 pgs.
U.S. Official Action dated Feb. 28, 2014, in U.S. Appl. No. 13/077,233, 31 pgs.
U.S. Official Action dated Jan. 14, 2016 in U.S. Appl. No. 13/076,862, 31 pgs.
U.S. Official Action dated Jan. 28, 2014, in U.S. Appl. No. 13/077,455, 15 pgs.
U.S. Official Action dated Jan. 7, 2014, in U.S. Appl. No. 13/077,303, 17 pgs.
U.S. Official Action dated Jul. 1, 2015 in U.S. Appl. No. 13/076,862, 32 pgs.
U.S. Official Action dated Jul. 10, 2014, in U.S. Appl. No. 13/077,303, 17 pgs.
U.S. Official Action dated Jul. 25, 2013 in U.S. Appl. No. 13/077,431 ,14 pgs.
U.S. Official Action dated Jun. 12, 2015, in U.S. Appl. No. 13/077,303, 21 pgs.
U.S. Official Action dated Jun. 26, 2014, in U.S. Appl. No. 13/077,455, 15 pgs.
U.S. Official Action dated Jun. 4, 2013, in U.S. Appl. No. 13/077,368, 7 pgs.
U.S. Official Action dated Jun. 4, 2015, in U.S. Appl. No. 13/077,396, 31 pgs..
U.S. Official Action dated Mar. 19, 2015, in U.S. Appl. No. 13/077,431, 15 pgs.
U.S. Official Action dated Mar. 20, 2014 in U.S. Appl. No. 13/076,862, 27 pgs.
U.S. Official Action dated Mar. 20, 2014, in U.S. Appl. No. 13/077,368, 8 pgs.
U.S. Official Action dated May 15, 2014 in U.S. Appl. No. 13/106,374, 28 pgs.
U.S. Official Action dated May 28, 2015 in U.S. Appl. No. 13/106,374, 40 pgs.
U.S. Official Action dated May 29, 2013, in U.S. Appl. No. 13/077,303, 15 pgs.
U.S. Official Action dated May 5, 2015, in U.S. Appl. No. 13/077,455, 10 pgs.
U.S. Official Action dated Nov. 19, 2014, in U.S. Appl. No. 13/077,396, 32 pgs.
U.S. Official Action dated Nov. 27, 2015, in U.S. Appl. No. 13/077,431, 15 pgs.
U.S. Official Action dated Nov. 3, 2014, in U.S. Appl. No. 13/077,303, 18 pgs.
U.S. Official Action dated Oct. 10, 2014, in U.S. Appl. No. 13/077,233, 34 pgs.
U.S. Official Action dated Oct. 2, 2014 in U.S. Appl. No. 13/106,374, 42 pgs.

(56) References Cited

OTHER PUBLICATIONS

U.S. Official Action dated Oct. 29, 2014, in U.S. Appl. No. 13/077,455, 17 pgs.
U.S. Official Action dated Sep. 15, 2014, in U.S. Appl. No. 13/077,368, 7 pgs.
U.S. Official Action dated Sep. 5, 2014, in U.S. Appl. No. 13/077,431, 15 pgs.
U.S. Appl. No. 13/077,233, Office Action dated Apr. 18, 2016, 36 pgs.
U.S. Appl. No. 13/077,303, Advisory Action dated Apr. 15, 2016, 3 pgs.
U.S. Appl. No. 13/077,303, Office Action dated May 3, 2016, 19 pgs.
U.S. Appl. No. 13/077,396, Office Action dated May 19, 2016, 36 pgs.
U.S. Appl. No. 13/106,374, Notice of Allowance dated May 13, 2016, 16 pgs.
U.S. Appl. No. 13/106,374, Notice of Allowance dated May 27, 2016, 2 pgs.
Vanderwende, et al. Abstract entitled "Microsoft Research at DUC2006: Task-Focused Summarization with Sentence Simplification and Lexical Expansion." Obtained on May 12, 2011 at website: http://citeseerx.ist.psu.edu/viewdoc/download?doi=10.1.1.114.2486&rep=rep1&type=pdf, 8 pgs.
Vickrey, et al. Abstract entitled "Sentence Simplification for Semantic Role Labeling." Obtained on May 12, 2011 at website: http://ai.stanford.edu/~dvickrey/underlying.pdf, 9 pgs.
Wang, et al, Article entitled "An Introduction to the Statistical Spoken Language Understanding" Published in the IEEE Signal Processing Magazine, vol. 22, No. 5, pp. 16-31; 2005. http://research.microsoft.com/pubs/75236/2005-Wang-Deng-Acero-SPM.pdf.
Wang, et al., article entitled "Idea Expander: Agent-Augmented Online Brainstorming,"—Published Date: Feb. 6-10, 2010, Savannah, Georgia. http://research.microsoft.com/en-us/um/redmond/groups/connect/cscw_10/docs/p535.pdf, 2 pgs.
Ward, et al. Abstract entitled "Recent Improvements in the CMU Spoken Language Understanding System." Obtained on May 12, 2011 at website: http://www.aclweb.org/anthology/H/H94/H94-1039.pdf, 4 pgs.
Website: Fully automated conversation dialog systems, Published Date: Jun. 10, 2008, http://www.gyruslogic.com, 2 pgs.
Website: Siri: Your Personal Assistant for the Mobile Web—Published Date: Feb. 4, 2010. http://www.readwriteweb.com/archives/siri_your_personal_assistant_for_the_mobile_web.php,3 pgs.
Website: The Future of Voice Arrives—Published Date: Jan. 11, 2007. http://www.voicebox.com/technology,2 pgs.
Yaman, et al., Article entitled "An Integrative and Discriminative Technique for Spoken Utterance Classification," Published in the IEEE Transactions on Audio, Speech, and Language Processing Magazine, vol. 16, No. 6, Aug. 2008. pp. 1207-1214. http://research.microsoft.com/pubs/73918/sibel.pdf, 8 pgs.
Cao et al., "Integrating Word Relationships into Language Models," In Proceedings of 28th Annual International ACM SIGIR Conference on Research and Development in Information Retrieval, Aug. 15, 2005, 8 pgs.
Chinese Office Action in Application 201210101485.4, dated Feb. 20, 2017, 5 pgs.
Chinese Notice of Allowance in Application 201210093414.4, dated Feb. 9, 2017, 8 pgs.
Japanese Notice of Allowance in Application 2014-502718, dated Feb. 1, 2017, 3 pgs. (No English Translation.).
Tur, et al., "Sentence Simplification for Spoken Language Understanding", In Proceedings of International Conference on Acoustics, Speech and Signal Processing, May 22, 2011, 4 pgs.
U.S. Patent Application entitled "Augmented Conversational Understanding Architecture" having U.S. Appl. No. 13/077,431, filed Mar. 31, 2011.
U.S. Patent Application entitled "Combined Activation for Natural User Interface Systems" having U.S. Appl. No. 13/077,368, filed Mar. 31, 2011.
U.S. Patent Application entitled "Conversational Dialog Learning and Correction" having U.S. Appl. No. 13/077,233 filed Mar. 31, 2011.
U.S. Patent Application entitled "Location-Based Conversational Understanding" having U.S. Appl. No. 13/077,455, filed Mar. 31, 2011.
U.S. Patent Application entitled "Location-Based Conversational Understanding" having U.S. Appl. No. 14/989,974, filed Jan. 7, 2016.
U.S. Patent Application entitled "Personalization of Queries, Conversations, and Searches" having U.S. Appl. No. 13/077,303, filed Mar. 31, 2011.
U.S. Patent Application entitled "Sentence Simplification for Spoken Language Understanding" having U.S. Appl. No. 13/106,374, filed May 12, 2011.
U.S. Patent Application entitled "Task Driven User Intents" having U.S. Appl. No. 13/077,396 filed Mar. 31, 2011.
U.S. Patent Application entitled "Translating Natural Language Utterances to Keyword Search Queries" having U.S. Appl. No. 13/592,638, filed Aug. 23, 2012.
U.S. Patent Application entitled "Translating Natural Language Utterances to Keyword Search Queries" having U.S. Appl. No. 14/733,188 filed Jun. 8, 2015.
U.S. Restriction Requirement dated Nov. 2, 2012, in U.S. Appl. No. 13/077,368, 14 pgs.
U.S. Official Action dated Jun. 11, 2013, in U.S. Appl. No. 13/077,455, 14 pgs.
Chinese Notice of Allowance in Application 201210092263.0, dated Feb. 28, 2017, 4 pgs.
Chinese 2nd Office Action in Application 201210090349.X, dated Feb. 28, 2017, 9 pgs.
Chinese 2nd Office Action in Application 201210090634.1, dated Mar. 21, 2017, 9 pgs.
U.S. Appl. No. 13/076,862, Notice of Allowance dated May 3, 2017, 14 pgs.
U.S. Appl. No. 13/077,303, *Ex-Parte Quayle* Action dated May 4, 2017, 6 pgs.
U.S. Appl. No. 14/989,974, Office Action dated Mar. 29, 2017, 16 pgs.
Chinese Notice of Allowance in Application 201210087420.9, dated May 4, 2017, 3 pgs.
U.S. Appl. No. 13/077,233, Appeal Brief filed Jun. 12, 2017, 32 pgs.
Chinese Notice of Allowance in Application 201210101485.4, dated Jun. 29, 2017, 4 pgs.
U.S. Appl. No. 13/077,396, Notice of Allowance dated Jul. 28, 2017, 25 pgs.
U.S. Appl. No. 13/077,431, Office Action dated Jul. 14, 2017, 15 pgs.
PCT 2nd Written Opinion in International Application PCT/US2016/050840, dated Jul. 24, 2017, 7 pgs.
U.S. Appl. No. 13/077,233, Examiners Answer to the Appeal Brief dated Aug. 4, 2017, 13 pgs.
U.S. Appl. No. 13/077,303, Notice of Allowance dated Aug. 24, 2017, 7 pgs.
Chinese Decision on Rejection in Application 201210091176.3, dated Aug. 2, 2017, 11 pgs.
U.S. Appl. No. 14/989,974, Office Action dated Aug. 14, 2017, 20 pgs.
Chinese Notice of Allowance in Application 201210090349.X, dated Aug. 31, 2017, 4pgs.
U.S. Appl. No. 13/077,396, Notice of Allowance dated Aug. 30, 2017, 20 pgs.
U.S. Appl. No. 14/733,188, Office Action dated Sep. 18, 2017, 15 pgs.
U.S. Appl. No. 13/077,303, Notice of Allowance dated Sep. 18, 2017, 2 pgs.
U.S. Appl. No. 13/077,396, USPTO Response to 312 Amendment dated Nov. 9, 2017, 2 pgs.
U.S. Appl. No. 14/856,139, Office Action dated Nov. 9, 2017, 18 pgs.
U.S. Appl. No. 15/818,432, Office Action dated Dec. 29, 2017, 15 pages.

(56) References Cited

OTHER PUBLICATIONS

Chinese 3rd Office Action in Application 201210090634.1, dated Oct. 31, 2017, 11 pages.
U.S. Appl. No. 14/989,974, Notice of Allowance dated Dec. 19, 2017, 8 pgs.
PCT International Preliminary Report on Patentability in International Application PCT/US2016/050840, dated Dec. 12, 2017, 9 pgs.
"Office Action Issued in Korean Patent Application No. 10-2013-7025578", dated May 17, 2018, 9 Pages.
"Office Action Issued in Korean Patent Application No. 10-2013-7025540", dated Jul. 13, 2018, 6 Pages.
"Office Action Issued in Korean Patent Application No. 1020137025586", dated May 21, 2018, 12 Pages.
"Non-Final Office Action Issued in U.S. Appl. No. 12/604,526", dated May 10, 2012, 21 Pages.
"Office Action Issued in European Patent Application No. 12763866.6", dated Jun. 27, 2018, 8 Pages.
"Office Action Issued in European Patent Application No. 12764494.6", dated Apr. 6, 2018, 6 Pages.
"Office Action Issued in European Patent Application No. 12764853.3", dated Jul. 12, 2018, 9 Pages.
"Office Action Issued in European Patent Application No. 12765100.8", dated Jul. 18, 2018, 10 Pages.
"Office Action Issued in European Patent Application No. 12765896.1", dated Aug. 20, 2018, 7 Pages.
"Office Action Issued in U.S. Appl. No. 13/077,431", dated May 22, 2018, 20 Pages.
"Office Action Issued in European Patent Application No. 13739555A", dated Nov. 2, 2015, 6 Pages.
"Final Office Action Issued in U.S. Appl. No. 14/856,139", dated Jun. 21, 2018, 19 Pages.
"Non Final Office Action Issued in U.S. Appl. No. 15/620,567", dated Jul. 13, 2018, 8 Pages.
"Final Office Action Issued in U.S. Appl. No. 15/818,432", dated Sep. 27, 2018, 26 Pages.
Zhao, Liang, "Dressed Human Modeling, Detection, and Parts Localization", In the Doctoral Dissertation in the Robotics Institute, Carnegie Mellon University, Pittsburgh, PA, Jul. 2001, 121 Pages.
"Office Action and Search Report Issued in Chinese Patent Application No. 201380035865.5", dated Dec. 23, 2016, 13 Pages.
Aggarwal, et al., "Human Motion analysis", In Proceedings of Computer Vision and Image Understanding, vol. No. 73, Issue No. 3, Mar. 1, 1999, 13 Pages.
Azarbayejani, et al, "Visually Controlled Graphics", In Proceedings of the IEEE Transactions on Pattern Analysis and Machine Intelligence, vol. 15, Issue 6, Jun. 1, 1993, 4 Pages.
Breen, et al., "Interactive Occlusion and Collusion of Real and Virtual Objects in Augmented Reality", In Journal European Computer Industry Research Center, Jan. 1995, 22 Pages.
Brody, "Body language user interface (BLUI)", In Proceedings of the Human Vision and Electronic Imaging III, vol. 3299, Jul. 17, 1998, pp. 400-410.
Brogan, et al., "Dynamically Simulated Characters in Virtual Environments", In Proceedings of the IEEE Computer Graphics and Applications, vol. 18, Issue 5, Sep. 1998, pp. 58-69.
Corominas, Aurora, "The Artist's Gesture. An Initial Approach to the Cinematic Representation of Vincent Van Gogh's Pictorial Practice", Retrieved from https://www.raco.cat/index.php/Formats/article/viewFile/256216/343206, 2001, 12 Pages.
Fisher, et al., "Virtual Environment Display System", In Proceedings of ACM Workshop on Interactive 3D Graphics, Jan. 1, 1998, 12 Pages.
Freeman, et al., "Television Control by Hand Gestures", In International Workshop on Automatic Face and Gesture Recognition, Jun. 26, 1994, 7 Pages.
Fukumoto, et al., "Finger-Pointer: Pointing Interface by Image Processing", In Journal Computers and Graphics, vol. 18, Issue 5, May 1994, pp. 633-642.
Gao, et al., "VS: Facial Sculpting in the Virtual World", In Proceedings of the International Conference on Computational Intelligence for Modelling Control and Automation, Nov. 28, 2006, 6 Pages.
Granieri, et al., "Simulating Humans in VR", In the Proceeding of Center for Human Modeling and Simulation, Oct. 12, 1994, 15 Pages.
Hauptmann, Alexander G., "Speech and Gestures for Graphic Image Manipulation", In Proceedings of the SIGCHI Conference on Human Factors in Computing Systems, Mar. 1, 1989, pp. 241-245.
Qian, et al., "A Gesture-Driven Multimodal Interactive Dance System", In International Conference of IEEE on Multimedia and Expo (ICME), Voume 03, Jun. 30, 2004, pp. 1579-1582.
Shivappa, et al., "Person Tracking With Audio-visual Cues Using Iterative Decoding Framework", In Proceedings of the 5th International Conference on Advanced Video and Signal Based Surveillance, Sep. 1, 2008, pp. 260-267.
Sonntag, et al., "SmartWeb Handheld—Multimodal Interaction with Ontological Knowledge Bases and Semantic Web Services", In the Proceeding of Artificial Intelligence for Human Computing, 2007, 8 Pages.
"Final Office Action Issued in U.S. Appl. No. 15/271,859", dated Jul. 13, 2018, 63 Pages.
Allen, et al., "An Architecture for More Realistic Conversational Systems", In Proceedings of 6th International Conference on Intelligent User Interfaces, Jan. 14, 2001, 8 Pages.
"Non Final Office Action Issued in U.S. Appl. No. 15/818,432", dated Jan. 25, 2019, 23 Pages.
"Non Final Office Action Issued in U.S. Appl. No. 12/512,859", dated Jan. 25, 2019, 23 Pages.
"Non Final Office Action Issued in U.S. Appl. No. 14/856,139", dated Dec. 10, 2018, 13 Pages.
"Non Final Office Action Issued in U.S. Appl. No. 15/271,859", dated Nov. 29, 2018, 49 Pages.
"Office Action Issued in Korean Patent Application No. 1020137/025578", dated Nov. 30, 2018, 4 Pages.
"Office Action Issued in European Patent Application No. 12763913.6", dated Jan. 14. 2019, 8 Pages.

* cited by examiner

AUGMENTED CONVERSATIONAL UNDERSTANDING AGENT TO IDENTIFY CONVERSATION CONTEXT BETWEEN TWO HUMANS AND TAKING AN AGENT ACTION THEREOF

RELATED APPLICATIONS

This patent application is a continuation of U.S. patent application Ser. No. 13/076,862, filed Mar. 31, 2011, now U.S. Pat. No. 9,760,566, which is incorporated herein in its entirety.

U.S. patent application Ser. No. 13/076,862 is also related to U.S. patent application Ser. No. 13/077,233, filed Mar. 31, 2011 and entitled "Conversational Dialog Learning and Correction,"; U.S. patent application Ser. No. 13/077,303, filed Mar. 31, 2011 and entitled "Personalization of Queries, Conversations, and Searches,"; U.S. patent application Ser. No. 13/077,368, filed Mar. 31, 2011 and entitled "Combined Activation for Natural User Interface Systems,"; U.S. patent application Ser. No. 13/077,396, filed Mar. 31, 2011 and entitled "Task Driven User Intents,"; U.S. patent application Ser. No. 13/077,431, filed Mar. 31, 2011 and entitled "Augmented Conversational Understanding Architecture,"; U.S. patent application Ser. No. 13/077,455, filed Mar. 31, 2011 and entitled "Location-Based Conversational Understanding,"; which are assigned to the same assignee as the present application and expressly incorporated herein, in their entirety, by reference.

BACKGROUND

An augmented conversational understanding agent may provide an interface for facilitating natural language understanding of user queries and conversations. In some situations, personal assistant programs and/or search engines often require specialized formatting and syntax. For example, a user's query of "I want to see 'Up in the Air' around 7" may be ineffective at communicating the user's true intentions when provided to a conventional system. Such systems may generally be incapable of deriving the context that the user is referring to a movie, and that the user desires results informing them of local theatres showing that movie around 7:00.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

An augmented conversational understanding agent may be provided. Upon receiving, by an agent, at least one natural language phrase from a user, a context associated with the at least one natural language phrase may be identified. The natural language phrase may be associated, for example, with a conversation between the user and a second user. An agent action associated with the identified context may be performed according to the at least one natural language phrase and a result associated with performing the action may be displayed.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
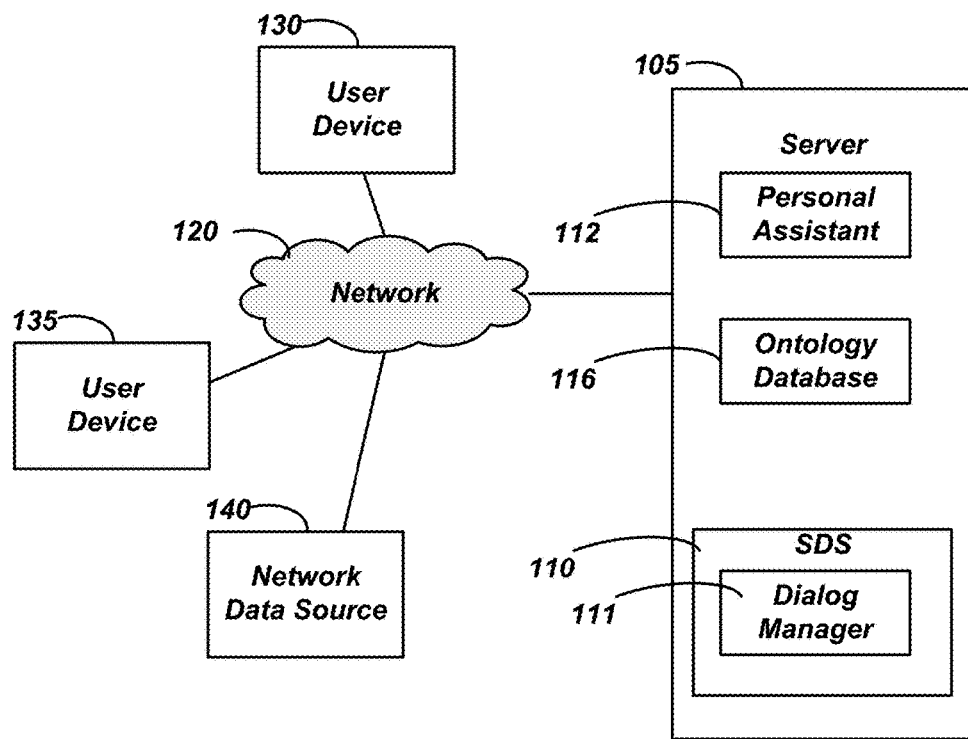
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

A personal assistant type agent may listen to voice and/or text conversations between users of a communication application and may parse the words to provide relevant information and feedback. The agent may also perform relevant tasks related to the conversations. The agent may include a natural language interface and may use input from a user, such as spoken and/or typed words, gestures, touchscreen interactions, intonations, and/or user ontologies to identify the context of the conversation, estimate the user intents, form an appropriate agent action, execute the agent action, and provide a result of the agent action to the user(s) via the communication application.

The agent may be associated with a spoken dialog system (SDS). Such systems enable people to interact with computers with their voice. The primary component that drives the SDS may comprise a dialog manager: this component manages the dialog-based conversation with the user. The dialog manager may determine the intention of the user through a combination of multiple sources of input, such as speech recognition and natural language understanding component outputs, context from the prior dialog turns, user context, and/or results returned from a knowledge base (e.g., search engine). After determining the intention, the dialog manager may take an action, such as displaying the final results to the user and/or continuing in a dialog with the user to satisfy their intent.

FIG. 1 is a block diagram of an operating environment 100 comprising a server 105. Server 105 may be operative to execute and/or manage assorted computing resources and/or software modules such as a spoken dialog system (SDS) 110 comprising a dialog manager 111, a personal assistant program 112, and/or an onotology database 116. SDS 110 may receive queries and/or action requests from users over network 120. Such queries may be transmitted, for example, from a first user device 130 and/or a second user device 135 such as a computer and/or cellular phone. Network 120 may comprise, for example, a private network, a cellular data network, and/or a public network such as the Internet. Operating environment 100 may further comprise a network data source, such as a website (e.g., a stock market site, a weather site, an e-mail server, a movie information site, etc.) and/or a network attached storage device. Onotology database 116 may comprise personal (e.g., user specific) ontology data and/or shared/public ontology data (e.g., an ontology associated with search engine results aggregated over multiple users). Consistent with embodiments of the invention, user device 130 and/or user device 135 may be operative to store a personal and/or shared ontology locally and/or may rely on ontology data stored in ontology database 116. For example, upon executing an agent action, a personal ontology stored on user device 130 may be merged with a shared ontology retrieved from ontology database 116 in order to create and/or evaluate the user's current context.

An ontology may generally comprise a plurality of semantic relationships between concept nodes. Each concept node may comprise a generalized grouping, an abstract idea, and/or a mental symbol and that node's associated attributes. For example, one concept may comprise a person associated with attributes such as name, job function, home location, etc. The ontology may comprise, for example, a semantic relationship between the person concept and a job concept connected by the person's job function attribute.

Figure 2A:
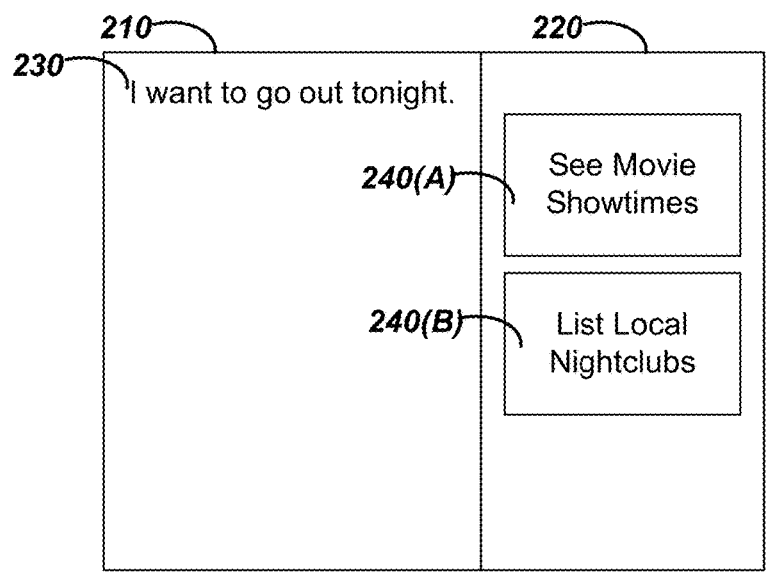
FIGS. 2A-2B are block diagrams of an interface for providing an augmented conversational understanding agent.

FIG. 2A is a block diagram of an interface 200 for providing an augmented conversational understanding agent. Interface 200 may, for example, be associated with personal assistant agent 112 and may comprise a user input panel 210 and a personal assistant panel 220. User input panel 210 may display converted user queries and/or action requests such as a user statement 230. User statement 230 may comprise, for example, a result from a speech-to-text conversion received from a user of user device 130. Personal assistant panel 220 may comprise a plurality of action suggestions 240(A)-(B) derived from a context state associated with the user and user statement 230. Consistent with embodiments of the invention, the context state may take into account any other participants in the conversation, such as a user of second user device 135, who may have heard the speaking of user statement 230. Personal assistant program 112 may thus monitor a conversation and offer action suggestions 240(A)-(B) to the user of first user device 130 and/or second user device 135 without being an active participant in the conversation.

Figure 2B:
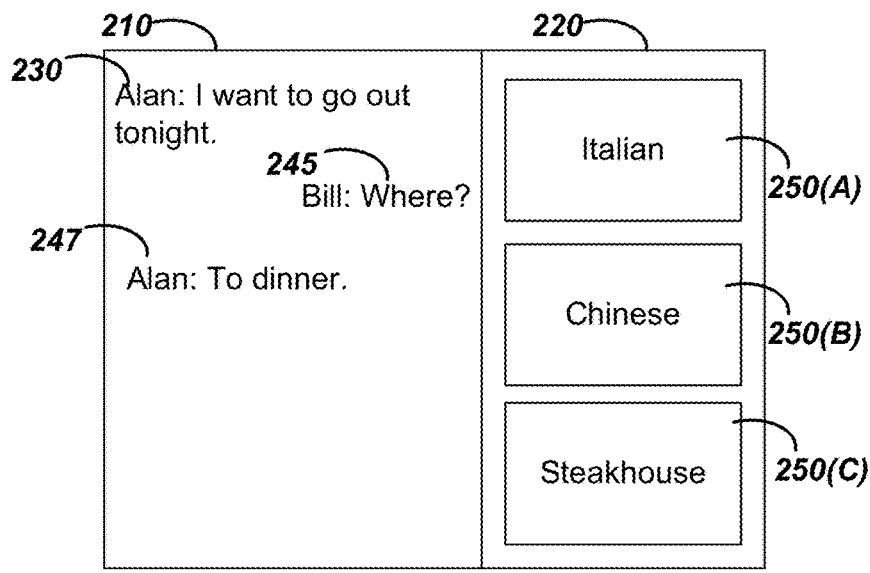

FIG. 2B is a further illustration of interface 200 comprising an updated display after a user provides an update to user statement 230. For example, a question 245 from a user of second user device 135 and a response 247 from the user of first user device 130 may cause personal assistant program 112 to update the context state and provide a second plurality of action suggestions 250(A)-(C). For example, second plurality of action suggestions 250(A)-(C) may comprise different suggested cuisines that the user may want to eat.

Figure 3:
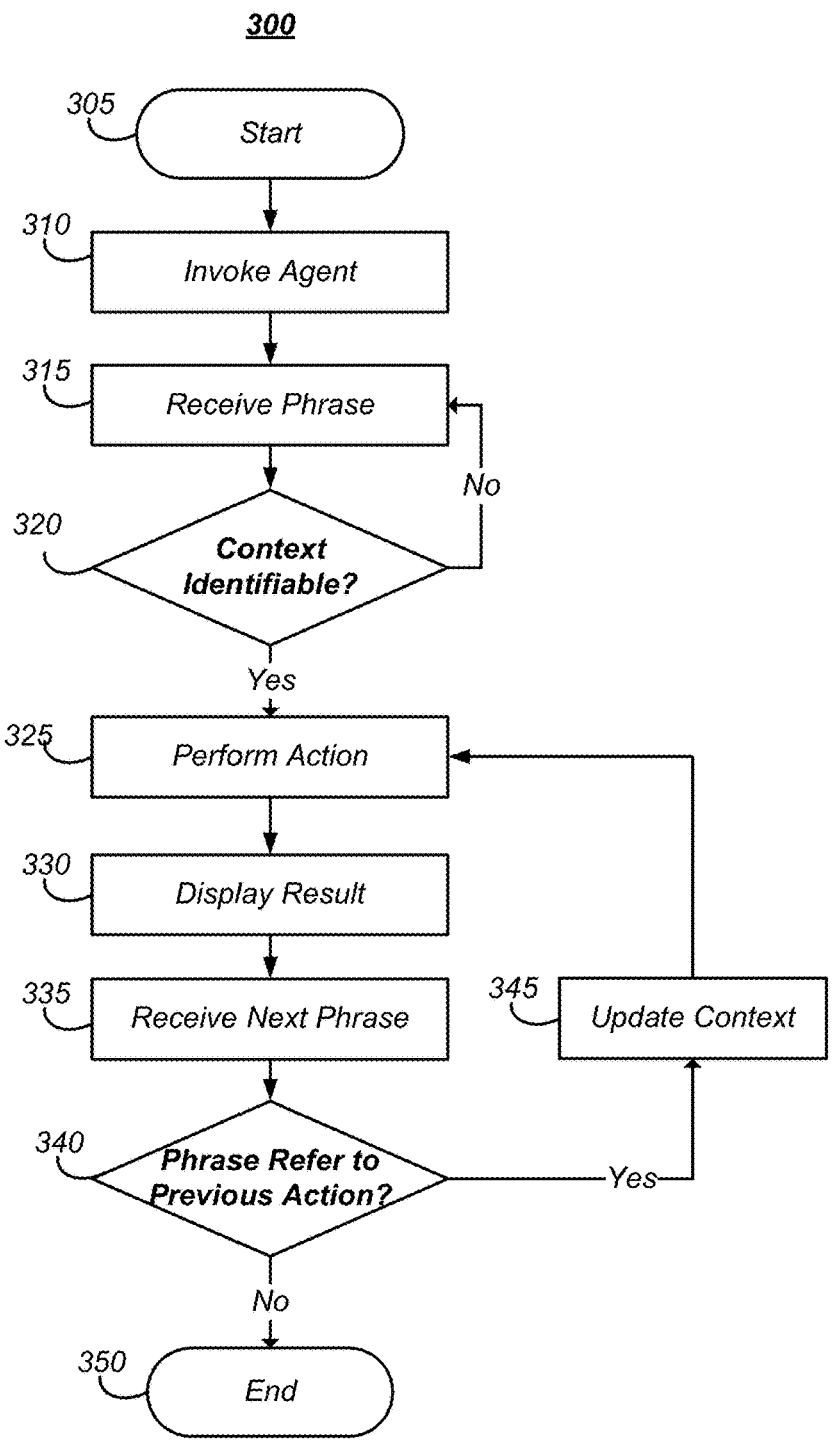
FIG. 3 is a flow chart of a method for providing an augmented conversational understanding agent.

FIG. 3 is a flow chart setting forth the general stages involved in a method 200 consistent with an embodiment of the invention for providing an augmented conversational understanding agent. Method 300 may be implemented using a computing device 500 as described in more detail below with respect to FIG. 5. Ways to implement the stages of method 300 will be described in greater detail below. Method 300 may begin at starting block 305 and proceed to stage 310 where computing device 500 may invoke an agent application. For example, SDS 110 may invoke personal assistant program 112. The invocation may comprise an explicit invocation request by the first user and/or an implicit invocation, such as may result from a request to begin a conversation between the first user and at least one second user.

Method 300 may then advance to stage 315 where computing device 500 may receive a first natural language phrase. For example, user device 130 may capture a phrase from the first user comprising "I want to go out to dinner tonight." The captured phrase may also be associated with user context information such as the user's location, time of day, appointment schedule, and other personal attributes.

Method 300 may then advance to stage 320 where computing device 500 may determine whether the first natural language phrase comprises enough data to identify a context. For example, SDS 110 may apply an understanding model to determine whether certain required parameters were included in the first phrase. The phrase "I want to go out to dinner tonight" may comprise enough information (e.g., a subject, a user, and a time frame) to translate the phrase into an action (e.g., a search for nearby restaurants with available seating). The phrase "I want to go out", however, may not be enough to translate into an action.

In response to determining that the first natural language phrase does not comprise enough data to identify a context, method 300 may return to stage 315 where computing device 500 may wait to receive at least one second natural language phrase. Otherwise, in response to determining that the first natural language phrase comprises enough data to identify a context, that context may be created and/or loaded as described below with respect to FIG. 4.

Method 300 may then advance to stage 325 where computing device 500 may perform an agent action associated with the first natural language phrase according to an ontology. For example, a search agent may execute the above-described search for nearby restaurants with available seating. Such a search may rely on a merged user ontology comprising the user's personal preferences with a shared ontology comprising a local area directory and/or restaurant reviews. Consistent with embodiments of the invention, the agent action may comprise identifying at least one suggestion associated with the natural language phrase. The suggestion may comprise, for example, a hypertext link, a visual image, at least one additional text word, and/or a suggested action. Where a first user is speaking to a work colleague about someone who brings in business, a suggested action of contacting the "rain man"—a slang term that may be identified as a synonym for a particular business partner in the user's personal ontology—may be identified. When the user's context identifies that the user is referring to the movie "Rain Man", however, a hypertext link to a website about the movie may instead be identified.

Method 300 may then advance to stage 330 where computing device 500 may display a result according to the performed action. For example, personal assistant program 112 may transmit information to user device 130 for display in personal assistant panel 220 of interface 200.

Method 300 may then advance to stage 335 where computing device 500 may receive at least one second natural language phrase. For example, the first user may specify "I want Chinese" and/or a second user may say "what about tomorrow?".

Method 300 may then advance to stage 340 where computing device 500 may determine whether the at least one second natural language phrase is associated with the currently identified context. For example, the phrases "I want Chinese" and "what about tomorrow" may be determined to reference going out to dinner, while a question from second user of "How do you like that new car?" may be determined to be associated with a new context. If the second phrase is not associated with the current context, method 300 may end at stage 350. Consistent with embodiments of the invention, computing device 500 may retain the invoked agent and restart method 300 at stage 320.

Otherwise, in response to determining that the at least one second natural language phrase is associated with the currently identified context, method 300 may advance to stage 345 where computing device 500 may update the current context according to the second phrase. For example, the phrase, "What about tomorrow?" may be translated into an updated action to search for reservations tomorrow instead of tonight.

Method 300 may then return to stage 325 where computing device 500 may perform the updated action associated with the updated context. Method 300 may continue to stage 330 and update the display according to a second result as described above.

Figure 4:
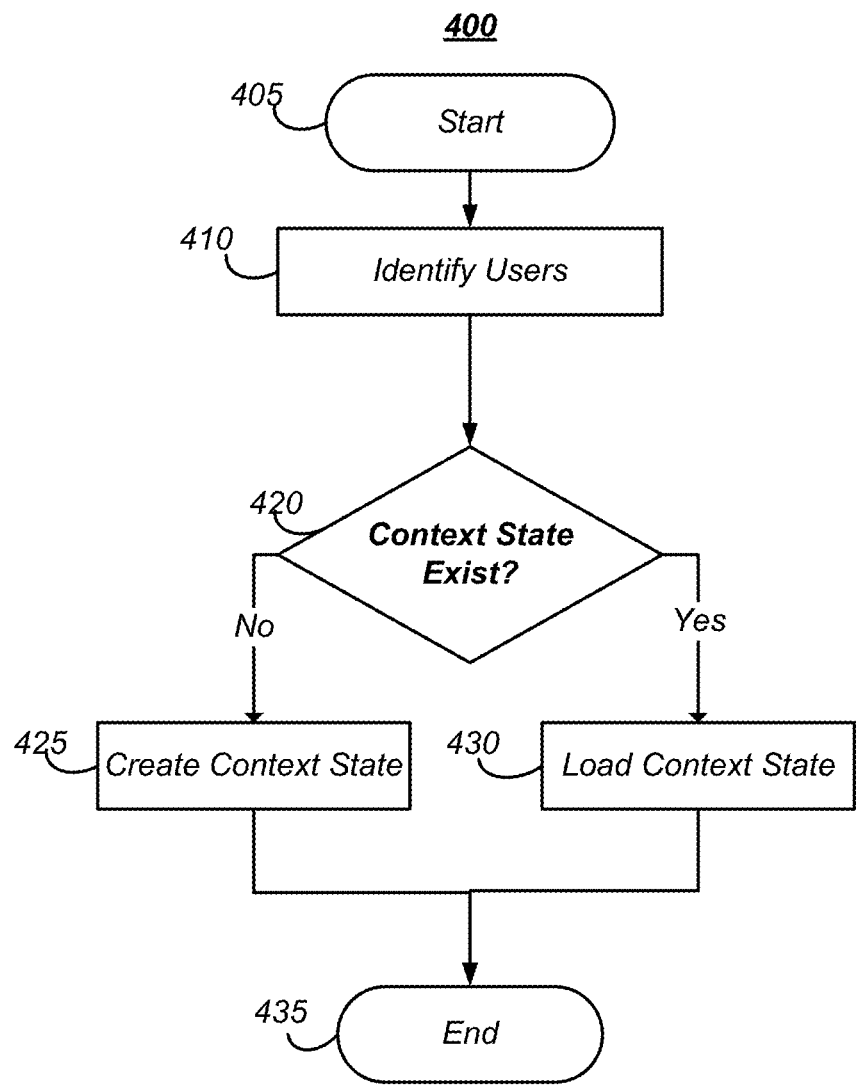
FIG. 4 is a flow chart of a subroutine used in the method of FIG. 3 for creating a context.

FIG. 4 is a flow chart of a subroutine 400 that may be used in method 300 for creating a context. Subroutine 400 may be implemented using computing device 500 as described in more detail below with respect to FIG. 5. Ways to implement the stages of subroutine 400 will be described in greater detail below. Subroutine 400 may begin at starting block 405 and proceed to stage 410 where computing device 500 may identify users involved in a conversation. For example, the first user, from whom a natural language phrase may be received, may be involved in a conversation with a second user. The first user and the second user may both be in range to be heard by first user device 130 and/or may be involved in a conversation via respective first user device 130 and second user device 135, such as cellular phones. Personal assistant program 112 may listen in on the conversation and identify the second user and that user's relationship to the first user (e.g., a personal friend, a work colleague, a spouse, etc.).

Subroutine 400 may then advance to stage 420 where computing device 500 may determine whether a context state associated with the first user and the second user exists. For example, SDS 110 may determine whether a context state associated with the two users may be derived from ontology database 116. Such a context state may comprise details of previous interactions between the two users, such as prior meetings, communications, speech habits, and/or preferences.

If the context state does not exist, subroutine 400 may advance to stage 425 where computing device 400 may create the context state according to at least one characteristic associated with the at least one second user. For example, a context state comprising data that the second user is the first user's boss may be created. Consistent with embodiments of the invention, the context state may comprise a merging of an ontology associated with the first user, an ontology associated with the second user, and/or a shared ontology.

If the context state does exist, subroutine 400 may advance to stage 430 where computing device 400 may load the context state. For example, personal assistant program 112 may load the context state from a user context database associated with server 105. After creating the context state at stage 425 or loading the context state at stage 430, subroutine 400 may end at stage 435 and/or return to the flow of method 300.

An embodiment consistent with the invention may comprise a system for providing an augmented conversational understanding. The system may comprise a memory storage and a processing unit coupled to the memory storage. The processing unit may be operative to receive at least one natural language phrase from a user, identify a context associated with the at least one natural language phrase, perform an agent action associated with the identified context according to the at least one natural language phrase, and display a result associated with performing the agent action. The phrase may be received in response to a user-commanded (e.g., explicit) and/or an implicit activation of a listening agent such as personal assistant program 112. For example, if a first user begins a conversation with a second user (e.g., via an instant messaging session and/or a telephone call), the processing unit may be operative to implicitly invoke the agent program, such as by sending a conversation request. The conversation request may comprise, for example, placing a telephone call, initiating an instant message session, beginning a teleconference, joining a collaboration application, and/or sending a communication request over any other medium (e.g., a social network application and/or a gaming network). Being operative to identify the context of the natural language phrase may comprise the processing unit being operative to identify at least one domain associated with at least one word of the natural language phrase.

The processing unit may be further operative to receive at least one second natural language phrase and determine whether the at least one second natural language phrase is associated with the identified context. If so, the processing unit may be operative to perform a second agent action associated with the identified context according to the at least one second natural language phrase and update the display according to a second result associated with the second agent action. In response to determining that the at least one second natural language phrase is not associated with the identified context, the processing unit may be operative to identify a second context associated with the at least one second natural language phrase, perform a second agent action associated with the second identified context according to the at least one second natural language phrase, and replace the display of the result with a second result associated with the second agent action.

Another embodiment consistent with the invention may comprise a system for providing an augmented conversational understanding. The system may comprise a memory storage and a processing unit coupled to the memory storage. The processing unit may be operative to receive a first natural language phrase from a user, wherein the at least one natural language phrase is associated with a conversation between the user and at least one second user, determine whether the first natural language phrase comprises enough data to identify a context, and, if so, perform an agent action associated with the identified context according to the at least one natural language phrase and display a result associated with performing the agent action. In response to determining that the first natural language phrase does not comprise enough data to identify a context, the processing unit may be operative to wait to receive at least one second natural language phrase and/or may request additional information from the user.

The processing unit may be further operative to determine whether the result is to be shared with the at least one second user and, if so, display the result associated with performing the agent action to the at least one second user. Being operative to determine whether the result is to be shared with the at least one second user may comprise, for example, the processing unit being operative to determine whether the agent action comprises retrieving a personal note created by the user, request authorization from the user to share the result with the at least one second user, determine whether a prior result associated with performing the agent action has been previously shared with the at least one second user, determine whether the result is associated with scheduling an event, and/or determine whether at least one second natural language phrase received from the user refers to the result.

Yet another embodiment consistent with the invention may comprise a system for providing an augmented conversational understanding. The system may comprise a memory storage and a processing unit coupled to the memory storage. The processing unit may be operative to invoke an agent application, receive a first natural language phrase, and determine whether the first natural language phrase comprises enough data to identify a context. Invocation of the agent application may occur in response to a request from a first user and wherein the request comprises, for example, an explicit invocation request by the first user and a request to begin a conversation between the first user and at least one second user. In response to determining that the first natural language phrase does not comprise enough data to identify a context, the processing unit may be operative to wait to receive at least one second natural language phrase. In response to determining that the first natural language phrase comprises enough data to identify a context, the processing unit may be operative to perform an agent action associated with the first natural language phrase, display a result according to the performed agent action, receive at least one second natural language phrase, and determine whether the at least one second natural language phrase is associated with the identified context. In response to determining that the at least one second natural language phrase is associated with the identified context, the processing unit may be operative to update the context, perform a second agent action associated with the updated context according to the at least one second natural language phrase and update the display according to a second result associated with the second agent action.

Figure 5:
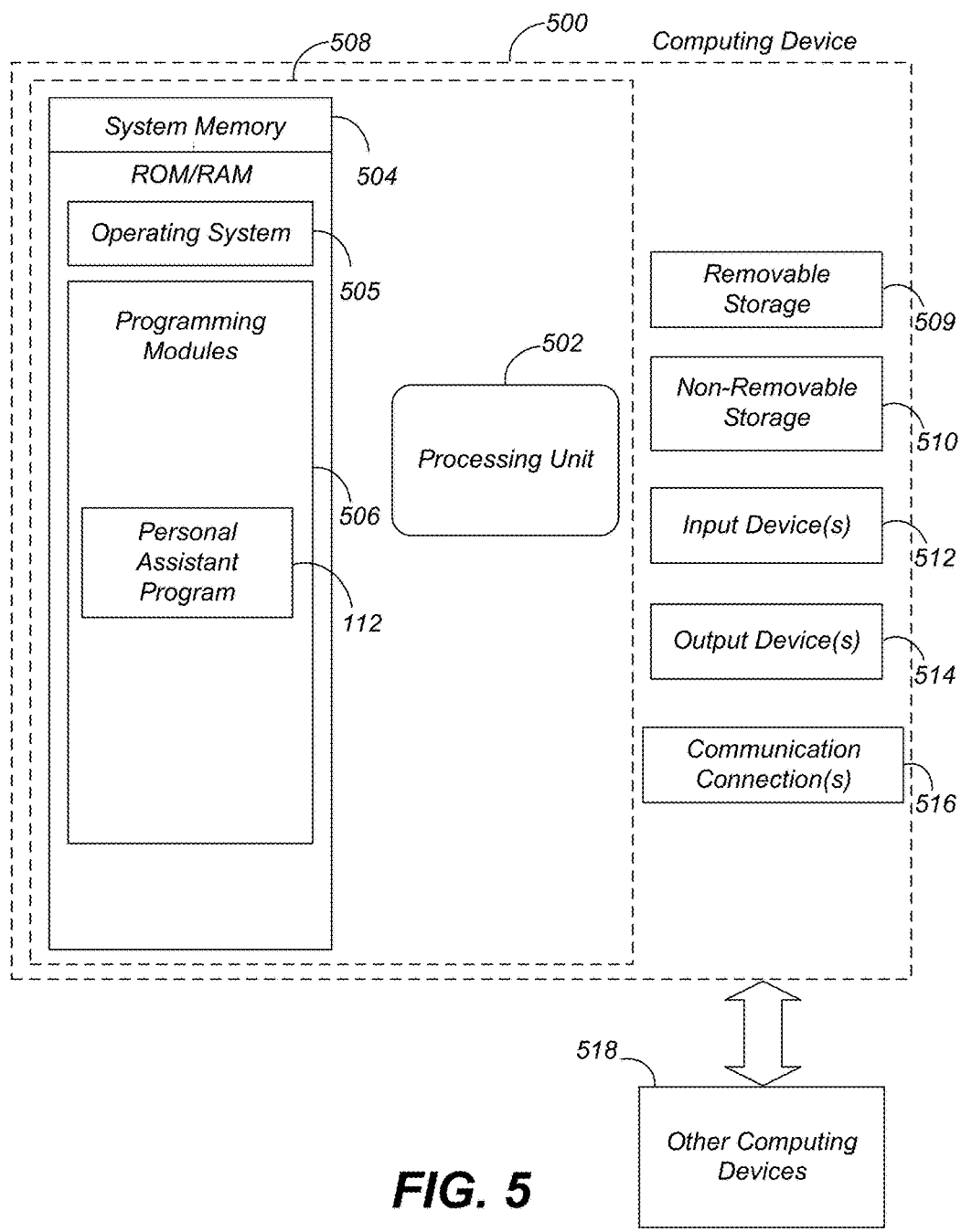
FIG. 5 is a block diagram of a system including a computing device.

FIG. 5 is a block diagram of a system including computing device 500. Consistent with an embodiment of the invention, the aforementioned memory storage and processing unit may be implemented in a computing device, such as computing device 500 of FIG. 5. Any suitable combination of hardware, software, or firmware may be used to implement the memory storage and processing unit. For example, the memory storage and processing unit may be implemented with computing device 500 or any of other computing devices 518, in combination with computing device 500. The aforementioned system, device, and processors are examples and other systems, devices, and processors may comprise the aforementioned memory storage and processing unit, consistent with embodiments of the invention. Furthermore, computing device 500 may comprise operating environment 100 as described above. Operating environment 100 may comprise other components and is not limited to computing device 500.

With reference to FIG. 5, a system consistent with an embodiment of the invention may include a computing device, such as computing device 500. In a basic configuration, computing device 500 may include at least one processing unit 502 and a system memory 504. Depending on the configuration and type of computing device, system memory 504 may comprise, but is not limited to, volatile (e.g. random access memory (RAM)), nonvolatile (e.g. read-only memory (ROM)), flash memory, or any combination. System memory 504 may include operating system 505, one or more programming modules 506, and may include a certificate management module 507. Operating system 505, for example, may be suitable for controlling computing device 500's operation. Furthermore, embodiments of the invention may be practiced in conjunction with a graphics library, other operating systems, or any other application program and is not limited to any particular application or system. This basic configuration is illustrated in FIG. 5 by those components within a dashed line 508.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by a removable storage 509 and a non-removable storage 510. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of device 500. Computing device 500 may also have input device(s) 512 such as a keyboard, a mouse, a pen, a sound input device, a touch input device, etc. Output device(s) 514 such as a display, speakers, a printer, etc. may also be included. The aforementioned devices are examples and others may be used.

Computing device 500 may also contain a communication connection 516 that may allow device 500 to communicate with other computing devices 518, such as over a network in a distributed computing environment, for example, an intranet or the Internet. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 504, including operating system 505. While executing on processing unit 502, programming modules 506 (e.g. ERP application 520) may perform processes including, for example, one or more of method 300's and/or subroutine 400's stages as described above. The aforementioned process is an example, and processing unit 502 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing an augmented conversational understanding agent, comprising:
   receiving, on a computing device, at least one natural language phrase from a human user, wherein the at least one natural language phrase is from a conversation between the human user and at least one second human user;
   identifying, by the computing device, a context associated with the received at least one natural language phrase, the context being identified by the computing device applying an understanding model to determine whether one or more parameters are included in the received at least one natural language phrase;
   performing, by the computing device, an implicitly requested agent action associated with the identified context according to the received at least one natural language phrase, wherein the agent action comprises an action suggestion offered without being an active participant in the conversation; and
   displaying, by the computing device, a result associated with performing the agent action.

2. The method of claim 1, wherein the received at least one natural language phrase is received from the human user in response to an implicit invocation.

3. The method of claim 2, wherein the implicit invocation occurs in response to a request to begin the conversation with the at least one second human user.

4. The method of claim 3, wherein the conversation occurs via an instant message session.

5. The method of claim 4, wherein the conversation occurs via a telephone call.

6. The method of claim 1, further comprising:
receiving at least one second natural language phrase;
determining whether the at least one second natural language phrase is associated with the identified context; and
when it is determined that the at least one second natural language phrase is associated with the identified context:
performing a second agent action associated with the identified context according to the at least one second natural language phrase, and
updating the display according to a second result associated with the second agent action.

7. The method of claim 6, further comprising, when it is determined that the at least one second natural language phrase is not associated with the identified context:
identifying a second context associated with the at least one second natural language phrase;
performing a third agent action associated with the second identified context according to the at least one second natural language phrase, and
replacing the display of the result with a second result associated with the third agent action.

8. The method of claim 1, wherein the received at least one natural language phrase is received from the human user in response to an explicit invocation.

9. The method of claim 1, wherein identifying the context of the natural language phrase further comprises identifying at least one domain associated with at least one word of the natural language phrase.

10. A computer-readable storage device storing a set of instructions, which when executed by a processing device, performs a method for providing an augmented conversational understanding agent, comprising:
receiving a natural language phrase from a human user, wherein the natural language phrase is from a conversation between the human and at least one second human user;
determining whether the received natural language phrase comprises enough data to identify a context, the context being identified by applying an understanding model to determine whether one or more parameters are included in the received natural language phrase; and
when it is determined that the received natural language phrase comprises enough data to identify the context:
performing an implicitly requested agent action associated with the identified context according to the received natural language phrase, wherein the agent action comprises an action suggestion offered without being an active participant in the conversation, and
displaying a result associated with performing the agent action.

11. The computer-readable storage device of claim 10, further comprising instructions for:
determining whether the result is to be shared with the at least one second human user; and
when determined that the result is to be shared with the at least one second human user, displaying the result associated with performing the agent action to the at least one second human user.

12. The computer-readable storage device of claim 11, wherein determining whether the result is to be shared with the at least one second human user comprises determining whether the agent action comprises retrieving a personal note created by the human user.

13. The computer-readable storage device of claim 11, wherein determining whether the result is to be shared with the at least one second human user comprises requesting authorization from the human user to share the result with the at least one second human user.

14. The computer-readable storage device of claim 11, wherein determining whether the result is to be shared with the at least one second human user comprises determining whether a prior result associated with performing the agent action has been previously shared with the at least one second human user.

15. The computer-readable storage device of claim 11, wherein determining whether the result is to be shared with the at least one second human user comprises determining whether the result is associated with scheduling an event.

16. The computer-readable storage device of claim 11, wherein determining whether the result is to be shared with the at least one second human user comprises determining whether at least one second natural language phrase received from the human user refers to the result.

17. The computer-readable storage device of claim 10, further comprising instructions for waiting to receive at least one second natural language phrase when it is determined that the received natural language phrase does not comprise enough data to identify a context.

18. The computer-readable storage device of claim 10, wherein the identified context comprises a merger of a first ontology associated with the human user and a second ontology associated with the at least one second human user.

19. The computer-readable storage device of claim 10, wherein performing the action comprises retrieving data from at least one network data source.

20. A system for providing a context-aware environment, comprising:
a memory storage; and
a processing unit coupled to the memory storage, wherein the processing unit is operative to:
invoke an agent application, wherein invoking the agent application occurs in response to a request from a first human user and wherein the request comprises at least one of the following: an explicit invocation request by the first human user and a request to begin a conversation between the first human user and at least one second human user,
receive a first natural language phrase, wherein the received first natural language phrase is from a conversation between the first human user and the at least one second human user,
determine whether the received first natural language phrase comprises enough data to identify a context, the context being identified by applying an understanding model to determine whether one or more parameters are included in the received first natural language phrase,
when determined that the received first natural language phrase does not comprise enough data to identify a context, wait to receive at least one second natural language phrase; and when it is determined that the received first natural language phrase comprises enough data to identify a context:
  perform an implicitly requested agent action associated with the received first natural language phrase, wherein the agent action comprises an action suggestion offered without being an active participant in the conversation;
  display a result according to the performed action;
  receive at least one second natural language phrase;
  determine whether the at least one second natural language phrase is associated with the identified context;
  when it is determined that the at least one second natural language phrase is associated with the identified context:
    update the identified context according to the at least one second natural language phrase;
    perform a second agent action associated with the updated context; and
    update the display according to a second result associated with the second action.

* * * * *